United States Patent
Matas et al.

(10) Patent No.: US 8,607,167 B2
(45) Date of Patent: Dec. 10, 2013

(54) PORTABLE MULTIFUNCTION DEVICE, METHOD, AND GRAPHICAL USER INTERFACE FOR PROVIDING MAPS AND DIRECTIONS

(75) Inventors: Michael Matas, San Francisco, CA (US); Chris Blumenberg, San Francisco, CA (US); Andre M. J. Boule, Sunnyvale, CA (US); Richard Williamson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 839 days.

(21) Appl. No.: 11/969,211

(22) Filed: Jan. 3, 2008

(65) Prior Publication Data

US 2008/0168396 A1 Jul. 10, 2008

Related U.S. Application Data

(60) Provisional application No. 60/937,993, filed on Jun. 29, 2007, provisional application No. 60/936,725, filed on Jun. 22, 2007, provisional application No. 60/879,469, filed on Jan. 8, 2007, provisional application No. 60/879,253, filed on Jan. 7, 2007.

(51) Int. Cl.
*G06F 3/033* (2013.01)
*G06F 3/00* (2006.01)
*G06F 3/048* (2013.01)
*G06F 3/0488* (2013.01)

(52) U.S. Cl.
CPC .................................. *G06F 3/04883* (2013.01)
USPC ........... 715/863; 715/840; 715/810; 715/835; 707/E17.114; 345/173

(58) Field of Classification Search
USPC .................. 345/173; 715/863, 840, 810, 835; 707/E17.114
See application file for complete search history.

(56) References Cited

U.S. PATENT DOCUMENTS

| 5,416,890 A | 5/1995 | Beretta ........................ 395/131 |
| 5,608,635 A | 3/1997 | Tamai ........................ 364/449.3 |

(Continued)

FOREIGN PATENT DOCUMENTS

| DE | 10 2005 047 648 A1 | 4/2007 |
| EP | 0 908 835 A2 | 4/1999 |

(Continued)

OTHER PUBLICATIONS

MioMap 2.0, 2005, User's Manual.*

(Continued)

*Primary Examiner* — Boris Pesin
*Assistant Examiner* — Ece Hur
(74) *Attorney, Agent, or Firm* — Morgan, Lewis & Bockius LLP

(57) ABSTRACT

A device has a touch screen display configured to display a map application, which is configured to separately display a list of bookmarked locations, a list of recent queries, and a list of contacts. In response to detecting a finger gesture on an input icon associated with a search term input area, the map application displays at least one of the list of bookmarked locations, the list of recent queries, and the list of contacts. In response to detecting a finger gesture on a bookmarked location, an area corresponding to the bookmarked location is displayed on a digital map. In response to detecting a finger gesture on a recent query, one or more results corresponding to the recent query are displayed on a digital map. In response to detecting a finger gesture on a contact, an area associated with the contact is displayed on a digital map.

6 Claims, 33 Drawing Sheets

(56) References Cited

U.S. PATENT DOCUMENTS

| | | | |
|---|---|---|---|
| 5,760,773 A | 6/1998 | Berman et al. ............... 345/347 |
| 5,825,352 A | 10/1998 | Bisset et al. ................. 345/173 |
| 5,877,751 A | 3/1999 | Kanemitsu et al. .......... 345/173 |
| 6,009,462 A * | 12/1999 | Birrell et al. ................. 709/206 |
| 6,040,824 A * | 3/2000 | Maekawa et al. ............ 345/173 |
| 6,115,025 A | 9/2000 | Buxton et al. |
| 6,380,931 B1 | 4/2002 | Gillespie et al. ............. 345/173 |
| 6,512,529 B1 * | 1/2003 | Janssen et al. ............... 715/790 |
| 6,600,502 B1 | 7/2003 | Brewster, Jr. |
| 6,667,751 B1 * | 12/2003 | Wynn et al. .................. 715/833 |
| 6,687,613 B2 * | 2/2004 | Yokota ......................... 701/428 |
| 6,983,203 B1 * | 1/2006 | Wako ........................... 701/533 |
| 7,032,187 B2 | 4/2006 | Keely, Jr. et al. ............ 715/863 |
| 7,046,230 B2 | 5/2006 | Zadesky et al. |
| 7,047,113 B1 * | 5/2006 | Burch et al. ...................... 701/4 |
| 7,047,133 B1 | 5/2006 | Dyer et al. ........................ 702/5 |
| 7,256,770 B2 * | 8/2007 | Hinckley et al. ............. 345/173 |
| 7,366,609 B2 * | 4/2008 | Lee ............................... 701/486 |
| 7,376,640 B1 * | 5/2008 | Anderson et al. ............ 701/533 |
| 7,379,811 B2 | 5/2008 | Rasmussen et al. |
| 7,439,969 B2 * | 10/2008 | Chithambaram et al. .... 345/418 |
| 7,479,949 B2 * | 1/2009 | Jobs et al. .................... 345/173 |
| 7,484,180 B2 * | 1/2009 | McCormack et al. ........ 715/764 |
| 7,495,659 B2 | 2/2009 | Marriott et al. |
| 7,499,040 B2 | 3/2009 | Zadesky et al. |
| 7,603,230 B2 * | 10/2009 | Suzuki et al. ................ 701/420 |
| 7,620,496 B2 * | 11/2009 | Rasmussen ................... 701/455 |
| 7,640,100 B2 * | 12/2009 | Spinelli ........................ 701/425 |
| 7,656,393 B2 | 2/2010 | King et al. |
| 7,663,607 B2 | 2/2010 | Hotelling et al. |
| 7,676,767 B2 | 3/2010 | Hofmeister et al. ......... 715/863 |
| 7,728,821 B2 * | 6/2010 | Hillis et al. .................. 345/173 |
| 7,768,395 B2 * | 8/2010 | Gold ........................... 340/539.2 |
| 7,797,642 B1 * | 9/2010 | Karam et al. ................ 715/810 |
| 7,800,592 B2 | 9/2010 | Kerr et al. |
| 7,808,479 B1 | 10/2010 | Hotelling et al. |
| 7,812,826 B2 * | 10/2010 | Ording et al. ................ 345/173 |
| 7,831,917 B1 * | 11/2010 | Karam .......................... 715/753 |
| 7,840,350 B2 * | 11/2010 | Spinelli ........................ 701/425 |
| 7,890,886 B2 * | 2/2011 | Matthews et al. ............ 715/809 |
| 7,891,103 B2 * | 2/2011 | Mayor et al. ................... 33/356 |
| 7,907,124 B2 | 3/2011 | Hillis et al. |
| 7,945,546 B2 * | 5/2011 | Bliss et al. ................... 707/705 |
| 8,090,533 B2 * | 1/2012 | Koike et al. ................. 701/410 |
| 8,095,303 B1 | 1/2012 | Nesbitt et al. |
| 8,171,432 B2 * | 5/2012 | Matas et al. ................. 715/863 |
| 8,205,157 B2 * | 6/2012 | Van Os et al. ............... 715/702 |
| 8,302,033 B2 * | 10/2012 | Matas et al. ................. 715/863 |
| 2001/0020211 A1 | 9/2001 | Takayama et al. |
| 2001/0045949 A1 | 11/2001 | Chithambaram et al. |
| 2002/0087262 A1 | 7/2002 | Bullock et al. ............... 701/202 |
| 2002/0183924 A1 * | 12/2002 | Yokota .......................... 701/209 |
| 2003/0177265 A1 * | 9/2003 | Page et al. .................... 709/245 |
| 2003/0231190 A1 * | 12/2003 | Jawerth et al. ............... 345/660 |
| 2004/0243307 A1 * | 12/2004 | Geelen .......................... 701/213 |
| 2005/0032527 A1 * | 2/2005 | Sheha et al. ................ 455/456.1 |
| 2005/0114021 A1 | 5/2005 | Krull et al. ................... 701/211 |
| 2005/0251331 A1 * | 11/2005 | Kreft ............................ 701/207 |
| 2006/0026521 A1 | 2/2006 | Hotelling et al. |
| 2006/0026535 A1 | 2/2006 | Hotelling et al. |
| 2006/0026536 A1 * | 2/2006 | Hotelling et al. ............ 715/863 |
| 2006/0047416 A1 | 3/2006 | Goldberg et al. |
| 2006/0143574 A1 * | 6/2006 | Ito et al. ....................... 715/800 |
| 2006/0181517 A1 | 8/2006 | Zadesky et al. |
| 2006/0197753 A1 | 9/2006 | Hotelling |
| 2006/0224311 A1 | 10/2006 | Watanabe et al. |
| 2006/0239248 A1 * | 10/2006 | Hawk et al. .................. 370/352 |
| 2006/0284852 A1 | 12/2006 | Hofmeister et al. .......... 345/173 |
| 2007/0083324 A1 * | 4/2007 | Suzuki et al. ................ 701/201 |
| 2007/0124062 A1 | 5/2007 | Janky et al. .................. 701/207 |
| 2007/0168888 A1 | 7/2007 | Jawerth ......................... 715/857 |
| 2007/0176796 A1 * | 8/2007 | Bliss et al. ............... 340/995.14 |
| 2007/0189737 A1 * | 8/2007 | Chaudhri et al. ............. 386/125 |
| 2007/0225904 A1 | 9/2007 | Pantalone et al. ............ 701/207 |
| 2007/0273664 A1 | 11/2007 | Kim et al. .................... 345/173 |
| 2008/0036743 A1 * | 2/2008 | Westerman et al. .......... 345/173 |
| 2008/0040315 A1 * | 2/2008 | Auerbach et al. ................. 707/3 |
| 2008/0055263 A1 * | 3/2008 | Lemay et al. ................ 345/173 |
| 2008/0055269 A1 * | 3/2008 | Lemay et al. ................ 345/173 |
| 2008/0086356 A1 * | 4/2008 | Glassman et al. ............. 705/10 |
| 2008/0088602 A1 | 4/2008 | Hotelling |
| 2008/0122796 A1 | 5/2008 | Jobs et al. |
| 2008/0147730 A1 * | 6/2008 | Lee et al. .................... 707/104.1 |
| 2008/0165144 A1 * | 7/2008 | Forstall et al. ............... 345/173 |
| 2008/0165153 A1 * | 7/2008 | Platzer et al. ................ 345/173 |
| 2008/0167809 A1 * | 7/2008 | Geelen .......................... 701/209 |
| 2008/0172357 A1 * | 7/2008 | Rechis et al. .................... 707/2 |
| 2008/0208456 A1 * | 8/2008 | Jouline et al. ................ 701/208 |
| 2008/0228386 A1 * | 9/2008 | Geelen et al. ................ 701/201 |
| 2008/0320391 A1 * | 12/2008 | Lemay et al. ................ 715/702 |
| 2008/0320419 A1 * | 12/2008 | Matas et al. ................. 715/863 |
| 2009/0024590 A1 * | 1/2009 | Sturge et al. ...................... 707/3 |
| 2009/0058820 A1 * | 3/2009 | Hinckley ...................... 345/173 |
| 2009/0064055 A1 * | 3/2009 | Chaudhri et al. ............. 715/863 |
| 2009/0172599 A1 * | 7/2009 | Nezu ............................. 715/841 |
| 2009/0177385 A1 * | 7/2009 | Matas et al. ................. 701/209 |
| 2009/0178007 A1 * | 7/2009 | Matas et al. ................. 715/835 |
| 2009/0244023 A1 * | 10/2009 | Kim et al. .................... 345/173 |
| 2009/0271745 A1 * | 10/2009 | Sakamoto et al. ............ 715/859 |
| 2009/0281724 A1 | 11/2009 | Blumenberg et al. ........ 701/208 |
| 2009/0295753 A1 | 12/2009 | King et al. |
| 2010/0005061 A1 * | 1/2010 | Basco et al. ..................... 707/3 |
| 2010/0031186 A1 * | 2/2010 | Tseng et al. .................. 715/786 |
| 2010/0225607 A1 * | 9/2010 | Kim ............................. 345/173 |
| 2010/0293186 A1 | 11/2010 | Nambata et al. |
| 2010/0309149 A1 | 12/2010 | Blumenberg et al. ........ 345/173 |
| 2010/0312462 A1 * | 12/2010 | Gueziec et al. .............. 701/117 |
| 2011/0041084 A1 * | 2/2011 | Karam .......................... 715/753 |
| 2011/0045868 A1 * | 2/2011 | Sheha et al. ............... 455/556.1 |
| 2011/0164058 A1 * | 7/2011 | Lemay .......................... 345/651 |
| 2012/0011137 A1 | 1/2012 | Sheha et al. |
| 2012/0287218 A1 * | 11/2012 | Ok ............................... 348/14.02 |
| 2012/0311478 A1 * | 12/2012 | van Os et al. ................ 715/780 |
| 2013/0055163 A1 * | 2/2013 | Matas et al. ................. 715/835 |
| 2013/0097173 A1 * | 4/2013 | Stovicek et al. ............. 707/741 |

FOREIGN PATENT DOCUMENTS

| | | |
|---|---|---|
| EP | 1 653 376 A2 | 5/2006 |
| EP | 1 840 511 A1 | 10/2007 |
| JP | 10 2008 008948 A1 | 8/2009 |
| WO | WO 97/07467 A1 | 2/1997 |
| WO | WO 98/07112 A2 | 2/1998 |
| WO | WO 03/017120 A1 | 2/2003 |
| WO | WO 2004/076977 A1 | 9/2004 |
| WO | WO 2005/104039 A2 | 11/2005 |
| WO | WO 2009/002942 A2 | 12/2008 |

OTHER PUBLICATIONS

MioMap 269, 2005, User's Manual.*
Google Maps in Search History, Apr. 2005, p. 1.*
Invitation to Pay Additional Fees for International Application No. PCT/US2008/067925, mailed Oct. 13, 2008.
International Search Report and Written Opinion for International Application No. PCT/US2008/067925, mailed Dec. 17, 2008.
International Search Report and Written Opinion for International Application No. PCT/US2008/050295, mailed Jan. 14, 2009.
International Preliminary Report on Patentability dated Jan. 7, 2010, received in International Application No. PCT/US2008/067925, which corresponds to U.S. Appl. No. 12/143,752, 14 pages.
Carew, S., "Phones that tell you where to Drive, Meet, Eat," 2 pages, May 26, 2007.
DaimlerCrysler, "Usecases Overview Map," 1 page.
Google, "Review Guide-Google Maps for Mobile (Beta)," 7 pages, 2006.
Invitation to Pay Additional Fees for International Applciation No. PCT/US2008/050295, mailed Jul. 29, 2008.
AV Bros., "AV Bros. Page Curl 2.0 for Windows and Mac OS X," AV Bros. Curl 2.0 User Guide, 2004, 26 pages, http://c0002649.cdn2.cloudfiles.rackspacecloud.com/avpagecurl20.pdf.

(56) References Cited

OTHER PUBLICATIONS

Google, "Google Maps Shows Real-Time Traffic Data," Google Operating System, Feb. 28, 2007, 1 pg., http://googlesystem.blogspot.com/2007/02/google-maps-shows-real-time-traffic.html.
Gralla, "Google™ Search and Tools in a Snap," Sams, Apr. 4, 2006, 15 pages.
Holthe et al., "Video Browsing Techniques for WebInterfaces," 2005, 5 pages, http://ieeexplore.ieee.org/Xplore/login.jsp?url=http%3A%2F%2Fieeexplore.ieee.org%2Fstamp.jsp%3Farnumber%3D01593233&authDecision=-203.
Mio, MioMap v 3.2 User Manual—Navigation software for Mio DigiWalker C310, Aug. 2006 (v1.00), US English version, http://www.gpspassion.com/upload/MioMap_englishUS.pdf.
Pixlewit, "PageFlip," Apr. 11, 2007, 1 page, http://web.archive.org/web/20070419035158/http://www.pixelwit.com/blog/page-flip/.
Office Action dated Jan. 25, 2011, received in U.S. Appl. No. 12/143,741.
Notice of Allowance dated Jul. 12, 2011, received in U.S. Appl. No. 12/143,741.
Office Action dated May 17, 2011, received in U.S. Appl. No. 12/143,752.
Dalrymple, J., "Google Maps Adds Locator, but not for iPhone," 2007, 1 page, <http://news.yahoo.com/s/macworld/20071130/tc_macworld/googlemaps20071130_0&printer=1;_ylt+Auvf3s6LQK_p)ajtb954T_DQni6gB >.
Flipping Book, "Premium Page Flipping," Flipping Book.com, downloaded Nov. 12, 2009, 1 page, <http://web.archive.org/web/20041207072330/http://www.page-flip.com/>.
iPhone Hacks, "iPhone Software/Hardware Hack: LocoGPS—GPS Add-on for the iPhone," 41 pages, Dec. 25, 2007,< http://www.iphonehacks.com/iphone_applications/index.html>.
Mio, "27 Countries in Your Pocket," Mio Technology, Sep. 2005, <http://www.mio-tech.be/en/printview/press-releases-2005-09-29.htm>.
Navizon, "FAQ, Peer-to Peer Wireless Positioning," 8 pages, Nov. 30, 2007, <http://www.navizon.com/FAQ.htm>.
Navizon, "How it Works," 7 pages, Nov. 30, 2007, <http://www.navizon.com/FullFeatures.htm >.
Navizon, "The First Positioning System that Combines GPS, WiFi and Phone Positioning," 2 pages, Nov. 30, 2007, <http://www.navizon.com >.
Tidwell, J., "Animated Transition," from Designing Interfaces, O'Reilly Media, Inc., Nov. 2005, pp. 84-85.
Waypoints Maplist View, "Featured Projects," Jun. 14, 2007, 3 pages, <http://eric.wahlforss.com/folio >.
Windows Mobile 6, "Fact Sheet," 2 pages, 2007, <www.WindowsMobile.com >.
Windows Mobile 6 Professional Video Tour, Mar. 11, 2007, 4 pages, <http://gizmodo.com/gadges/cellphones/windows-mobile-6-professional-video-tour-237039.php>.
Windows Moblile Map Contact List, "Windows Live Search for Mobile Goes Final, Still Great," Mar. 11, 2007,< http://gizmodo.com/gadgets/software/windows-live-search-for-mobile-goes-final-still-great-236002.php>.
Dornfest. "Google Hacks." Third Edition, Aug. 3, 2006, O'Reilly Media, Inc., 5 pages.
Mol, H., "Plan Your Trip With Google Maps," Visual Steps, Dec. 2009, 36 pages, <http://www.visualsteps.com/downloads/Free_guide_google_maps.pdf >.
Invitation to Pay Additional Fees dated Dec. 1, 2011, which corresponds to U.S. Appl. No. 12/788,281 (van Os).
Tidwell J., "Designing Interfaces," Nov. 2006, O'Reilly Media, Inc., 348 pages.
Westerman, W., "Hand Tracking Finger Identification and Chordic Manipulation on a Multi-touch Surface," Doctoral Dissertation, submitted Spring 1999, 363 pages.
Notice of Allowance dated Dec. 30, 2011, received in U.S. Appl. No. 12/143,741 (Matas).
Final Office Action dated Dec. 23, 2011. received in U.S. Appl. No. 12/143,752 (Matas).
Notice of Allowance dated Oct. 23, 2012, received in U.S. Appl. No. 12/566,668, 12 pages (Blomenberg).
Notice of Allowance dated Jun. 26, 2012, received in U.S. Appl. No. 12/789,440, 14 pages (van Os).
Office Action dated Sep. 26, 2012, received in U.S. Appl, No. 12/788,281, 14 pages (Van Os).
International Search Report and Written Opinion dated Apr. 12, 2012, received in International Application No. PCT/US2010/020229, which corresponds to U.S. Appl. No. 12/788,281, 18 pages (van Os).
Office Action dated Jun. 18, 2012, received in U.S. Appl. No. 12/566,668, 40 pages (Blumenberg).
Office Action dated Feb. 17, 2012. received in U.S. Appl. No. 12/788,281, 14 pages (van Os).
Apple.com, "Maps with GPS," Apple.com May 2009, http://www.apple.com/iphone/features/maps.html, 2 pages.
Kim, "Video-In and Magnetometers Could Introduce Interesting iPhone App Possibilities," Mac Rumors, Apr. 8, 2009, http://www.macrumors.com/2009/04/08/video-in-and-magnetometers-could-introduce-interesting-iphone-app-possibilites/, 5 pages.
The Boy Genius, "Magnetometer in next iPhone confirmed?" The Boy Genius Report, May 7, 2009, http://www.boygeniusreport.com/2009/05/07/magnetometer-in-next-iphone-confirmed/, 15 pages.
YouTubo, "G-Map for iPhone: About menus and basic functions," at 1:37/5:49 Heading up Map View Mode, 5:49 video uploaded to YouTube by navi0808, on Feb. 24, 2009, http://www.youtube.com/watch?v=tN8uW_rM0Q, 1 page.
YouTube, "G-Map for iPhone: About menus and basic functions," at 1:45/5:49 North-up Map View Mode, 5:49 video uploaded to YouTube by navi0808, on Feb. 24, 2009, http://www.youtube.com/watch?v=tN8uW_rM0Q, 1 page.
YouTube, "G-Map for iPhone Demo: 3-Way Map Mode," at 1:03/1:34 Heading-up Mode, 1:34 video uploaded to YouTube by navi0808, on Feb. 13, 2009, http://www.youtube.com/watch?v=QQusXdlXarl&feature=related, 2 pages.
YouTube, "G-Map U.S. iPhone Review," 6:29 video uploaded to YouTube by TapCritic, on Mar. 10, 2009, http://www.youtube.com/watch?v=xrWUKwXQwIQ&feature=related, 1 page.
Notice of Allowance dated Feb. 7, 2013, received in U.S. Appl. No. 12/566,668, 12 pages (Blumenberg).

\* cited by examiner

PORTABLE MULTIFUNCTION DEVICE, METHOD, AND GRAPHICAL USER INTERFACE FOR PROVIDING MAPS AND DIRECTIONS

RELATED APPLICATIONS

This application claims priority to U.S. Provisional Patent Application Nos. 60/937,993, "Portable Multifunction Device," filed Jun. 29, 2007; 60/936,725, "Portable Multifunction Device, Method, and Graphical User Interface for Providing Maps and Directions," filed Jun. 22, 2007; 60/879,469, "Portable Multifunction Device," filed Jan. 8, 2007; and 60/879,253, "Portable Multifunction Device," filed Jan. 7, 2007. All of these applications are incorporated by reference herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; and (11) U.S. Provisional Patent Application No. 60/824,769, "Portable Multifunction Device," filed Sep. 6, 2006. All of these applications are incorporated by reference herein in their entirety.

TECHNICAL FIELD

The disclosed embodiments relate generally to portable electronic devices, and more particularly, to portable devices that provide maps and directions.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

For example, mapping applications are available for mobile phones (e.g., Google maps for mobile, available at www.google.com/gmm). But navigating in such applications using physical push buttons (e.g., the number keys on a hard keyboard) or touch screens in existing mobile phones is cumbersome for most users. Thus, at present, relatively few people use mapping applications in mobile phones and other portable devices.

Accordingly, there is a need for portable electronic devices with more transparent and intuitive user interfaces for providing maps and directions. Such interfaces increase the effectiveness, efficiency and user satisfaction with portable devices.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, in addition to providing maps and directions, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

In some embodiments, a device having a touch screen display is configured to display a map application, which is configured to separately display a list of bookmarked locations, a list of recent queries by a user, and a list of contacts for the user. In response to detecting a finger gesture on an input icon associated with a search term input area, the map application displays at least one of the list of bookmarked locations, the list of recent queries by a user, and the list of contacts for the user. In response to detecting a finger gesture on a bookmarked location in the list of bookmarked locations, an area corresponding to the bookmarked location is displayed on a digital map. In response to detecting a finger gesture on a recent query in the list of recent queries by the user, one or more results corresponding to the recent query are displayed on a digital map. And in response to detecting a finger gesture on a contact in the list of contacts, an area associated with the contact is displayed on a digital map.

In another aspect of the invention, a device having a touch screen display is configured to display a map application. The map application is configured to simultaneously display a bookmark list display icon, a recent query list display icon, and a contact list display icon, and is also configured to separately display a list of bookmarked locations, a list of recent queries by a user, and a list of contacts for the user. In response to detecting a finger gesture on the bookmark list display icon the map application displays the list of bookmarked locations. In response to detecting a finger gesture on a bookmarked location in the list of bookmarked locations, the map application displays an area corresponding to the bookmarked location on a digital map. In response to detecting a finger gesture on the recent query list display icon, the map application displays the list of recent queries by the user. And in response to detecting a finger gesture on a recent query in the list of recent queries by the user, the map application displays one or more results corresponding to the recent query on a digital map.

In yet another aspect of the invention, a portable computing device having a touch screen display is configured to operate as follows. In response to detecting a finger gesture on a route search initiation icon, it sends a first location and a second location to a remote computer, receives routing information between the first location and the second location, and displays at least some of the routing information between the first location and the second location on a digital map. In response to detecting a finger gesture on a list icon, it displays an itemized list of the routing information, and in response to detecting a finger gesture on a particular item in the itemized list of the routing information, the device shows a corresponding portion of routing information on the digital map.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
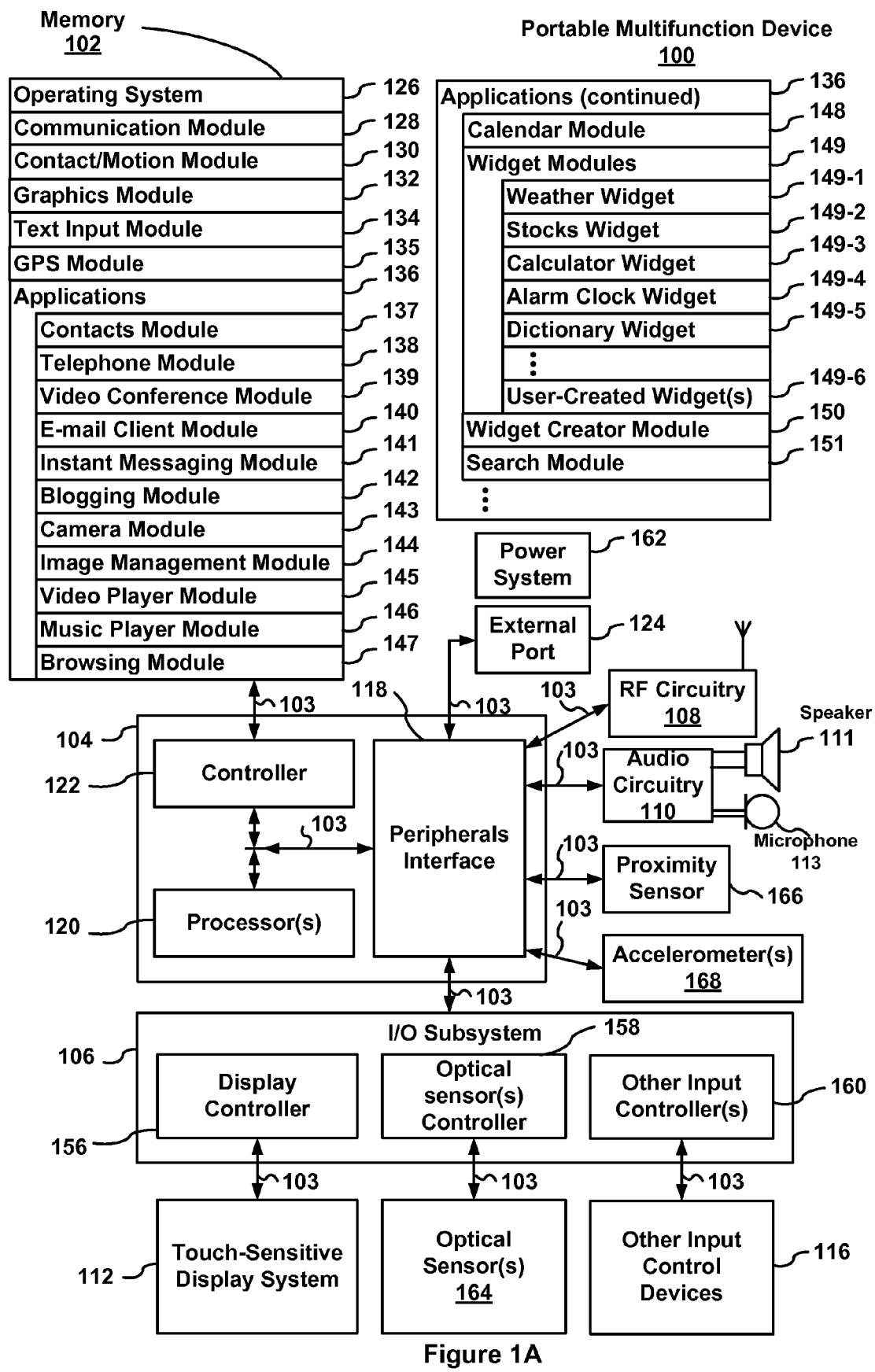
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
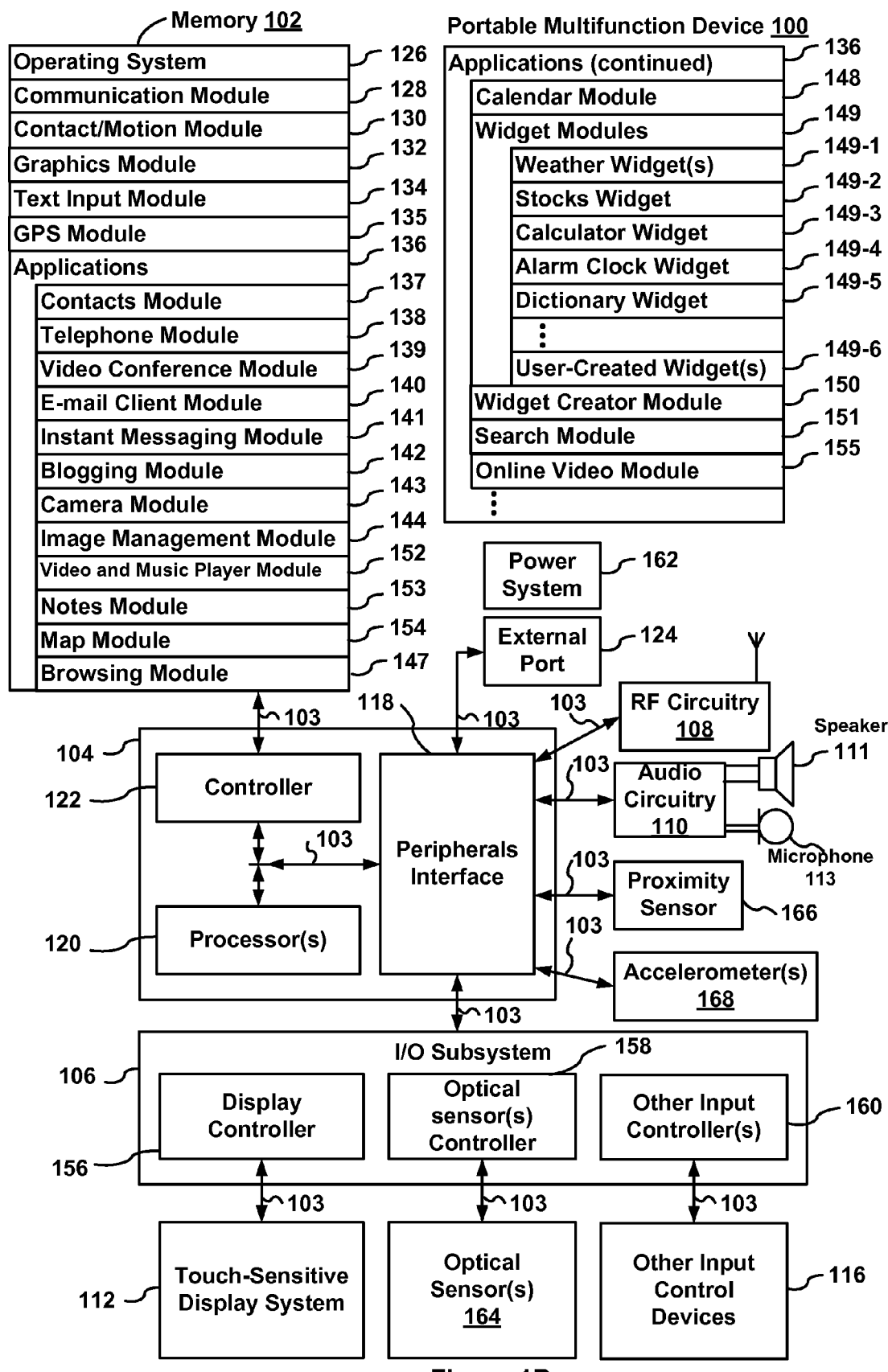

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

Figure 2:
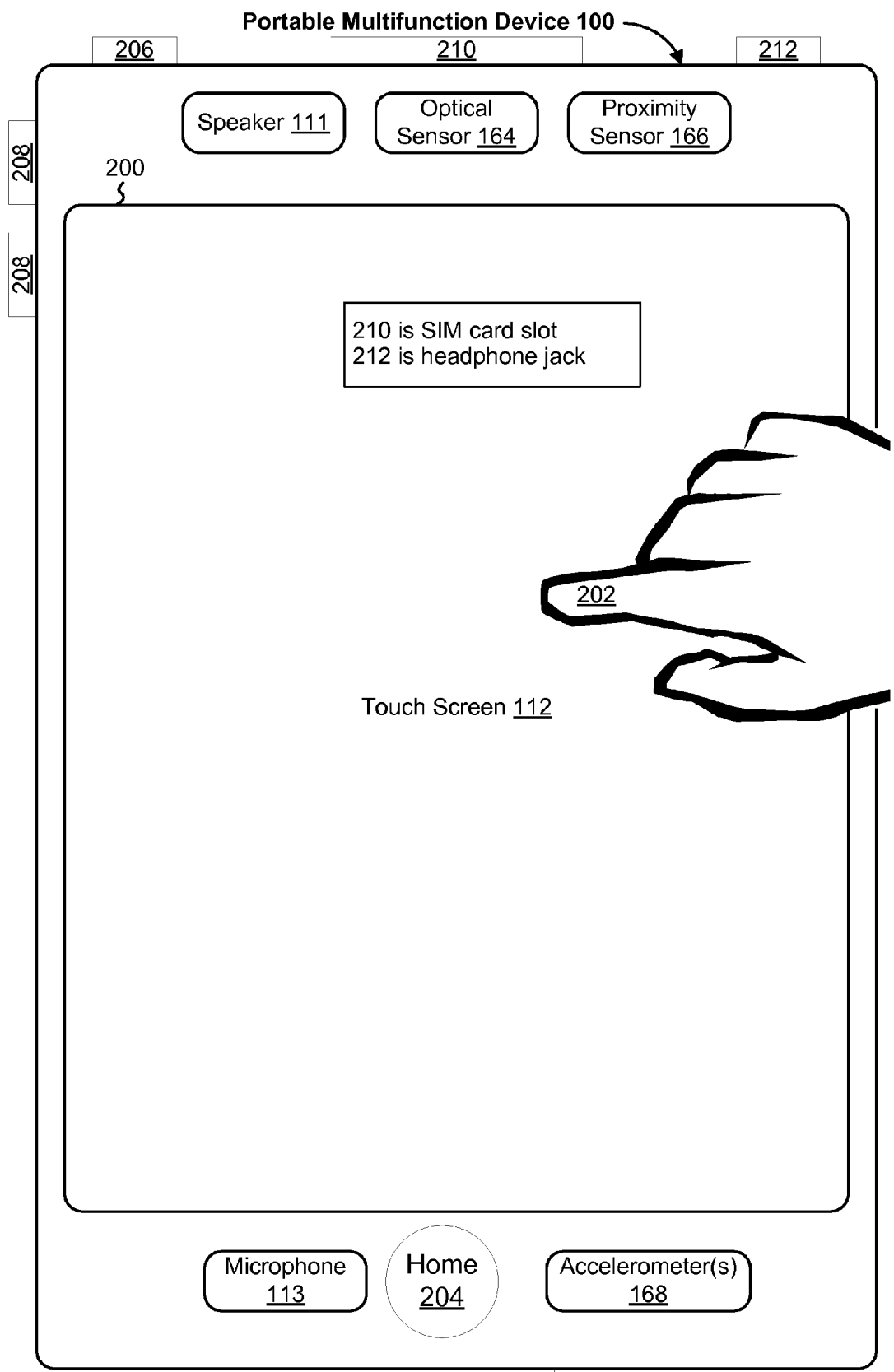
FIG. 2 illustrates a portable multifunction device having a touch screen in accordance with some embodiments.

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g.,

206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector In Handheld Device," filed Sep. 30, 3005; 11/240,788, "Proximity Detector In Handheld Device," filed Sep. 30, 3005; 11/620,702, "Using Ambient Light Sensor To Augment Proximity Sensor Output"; 11/586, 862, "Automated Response To And Sensing Of User Activity In Portable Devices," filed Oct. 24, 2006; and 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;

widget modules 149, which may include weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which merges video player module 145 and music player module 146;

notes module 153;

map module 154; and/or online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Embodiments of user interfaces and associated processes using online video module 155 are described further below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
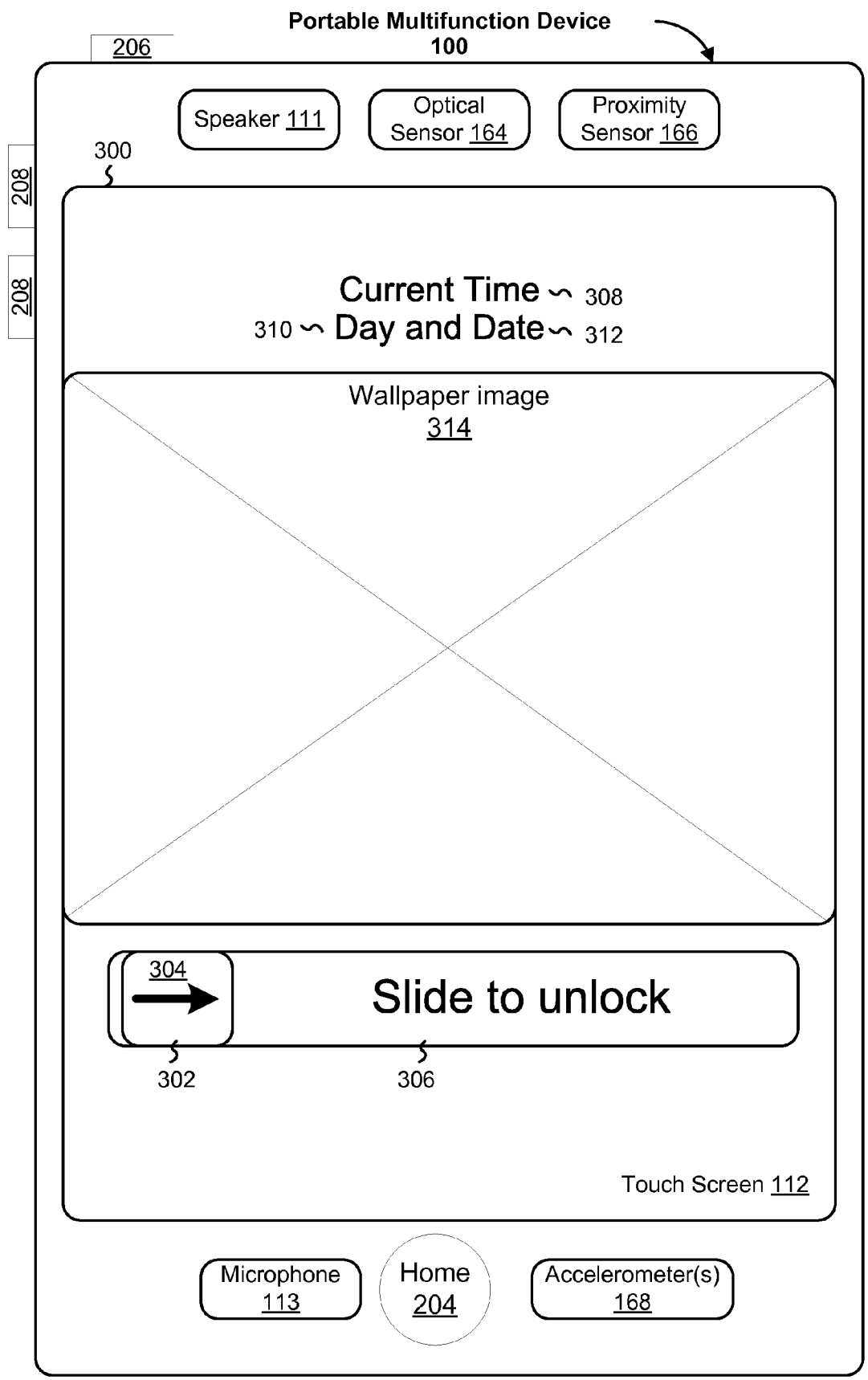
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. Nos. 11/322,549, "Unlocking A Device By Performing Gestures On An Unlock Image," filed Dec. 23, 2005, and 11/322,550, "Indication Of Progress Towards Satisfaction Of A User Input Condition," filed Dec. 23, 2005, which are hereby incorporated by reference in their entirety.

Figure 4A:
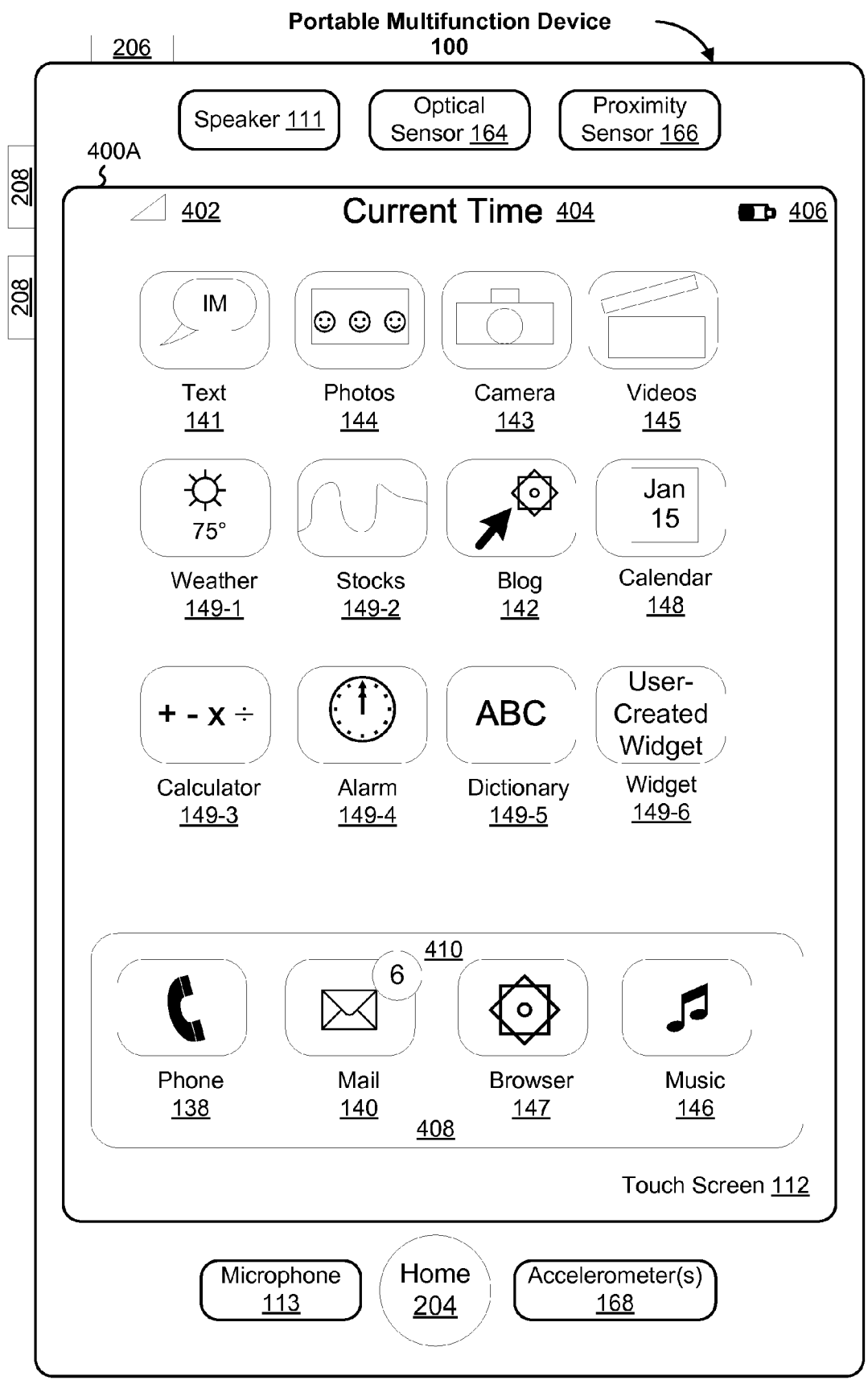
FIGS. 4A and 4B illustrate exemplary user interfaces for a menu of applications on a portable multifunction device in accordance with some embodiments.
Figure 4B:
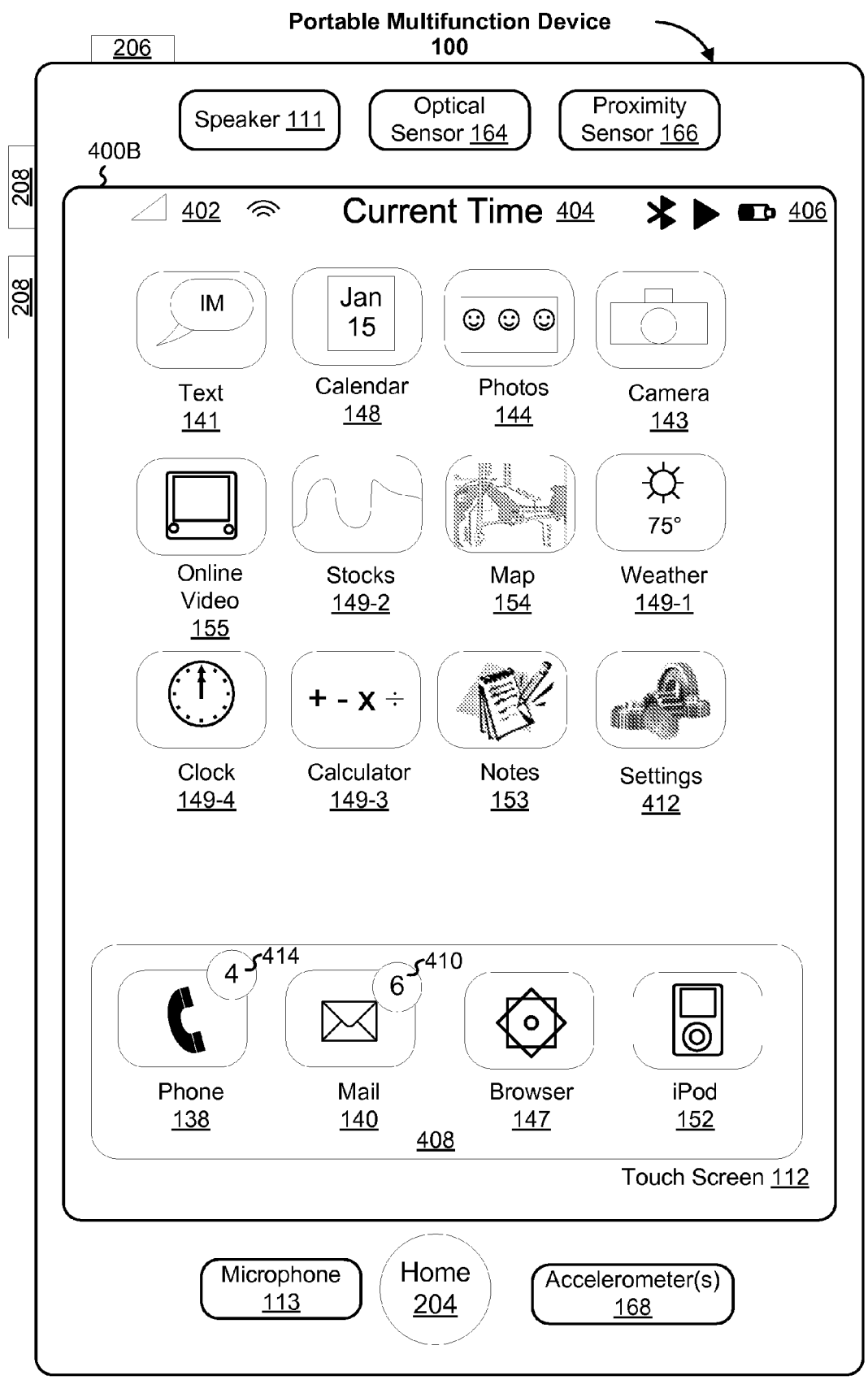

FIGS. 4A and 4B illustrate exemplary user interfaces for a menu of applications on a portable multifunction device in accordance with some embodiments. In some embodiments, user interface 400A includes the following elements, or a subset or superset thereof:

Signal strength indicator(s) 402 for wireless communication(s), such as cellular and Wi-Fi signals;
Time 404;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Blog 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
402, 404, 406, 141, 148, 144, 143, 149-3, 149-2, 149-1, 149-4, 410, 414, 138, 140, and 147, as described above;
Map 154;
Notes 153;
Settings 412, which provides access to settings for the device 100 and its various applications 136, as described further below;
Video and music player module 152, also referred to as iPod (trademark of Apple Computer, Inc.) module 152; and
Online video module 155, also referred to as YouTube (trademark of Google, Inc.) module 155.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

Figure 5A:
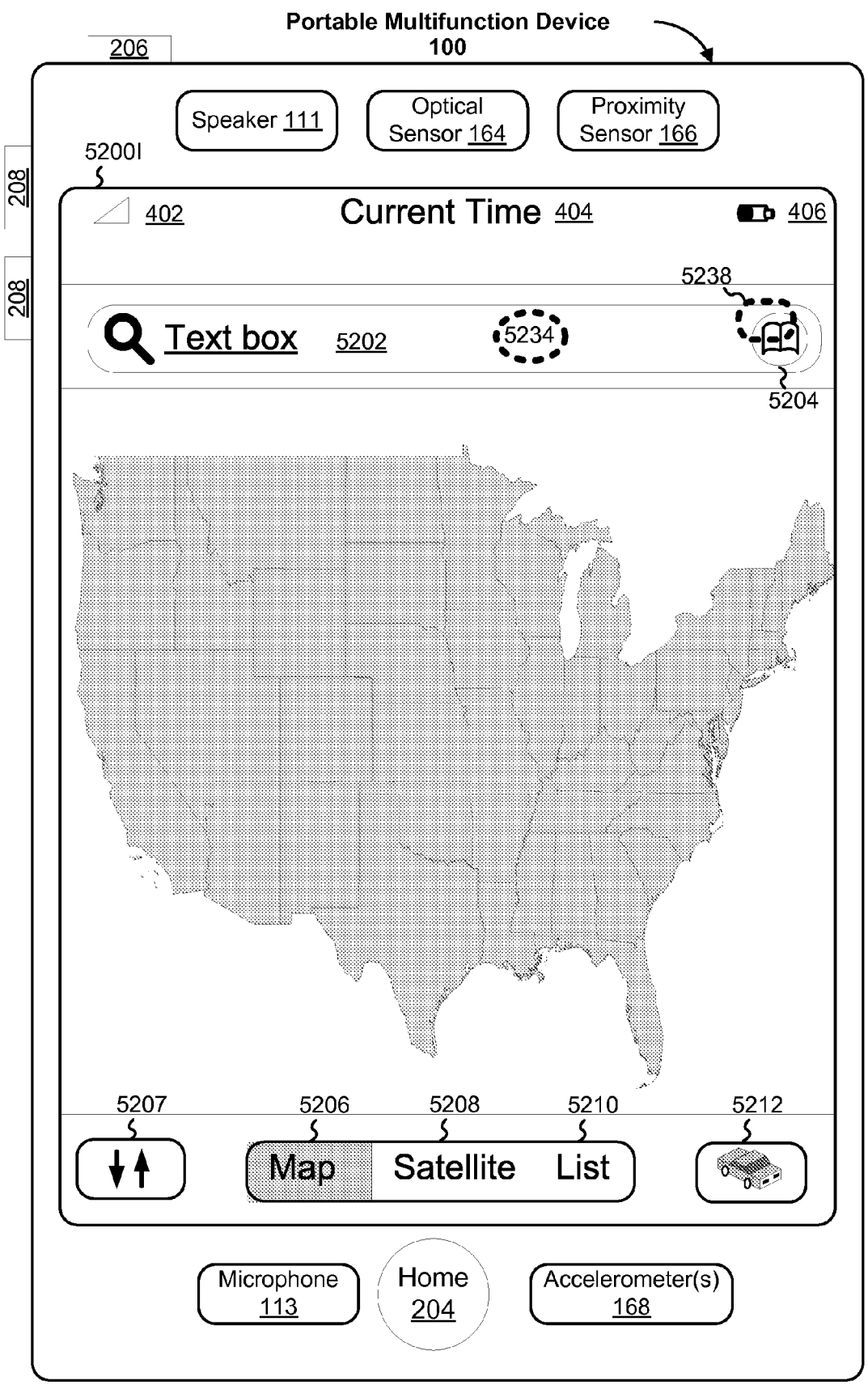
FIGS. 5A-5AA illustrate exemplary user interfaces for a map application in accordance with some embodiments.

FIGS. 5A-5AA illustrate exemplary user interfaces for a map application in accordance with some embodiments.

In some embodiments, a computer-implemented method is performed at a portable electronic device (e.g., 100) with a touch screen display 112.

In some embodiments, in response to detecting a finger gesture 5230 (e.g., a finger tap gesture) on a search icon 5232 (FIG. 5C), the device displays a search term input area 5202 (e.g., text input box, FIG. 5A) for entering one or more search terms.

In some embodiments, in response to detecting a finger gesture 5234 (e.g., a finger tap gesture) on the search term input area, the device displays a keyboard 5236 for entering the one or more search terms.

Figure 5B:
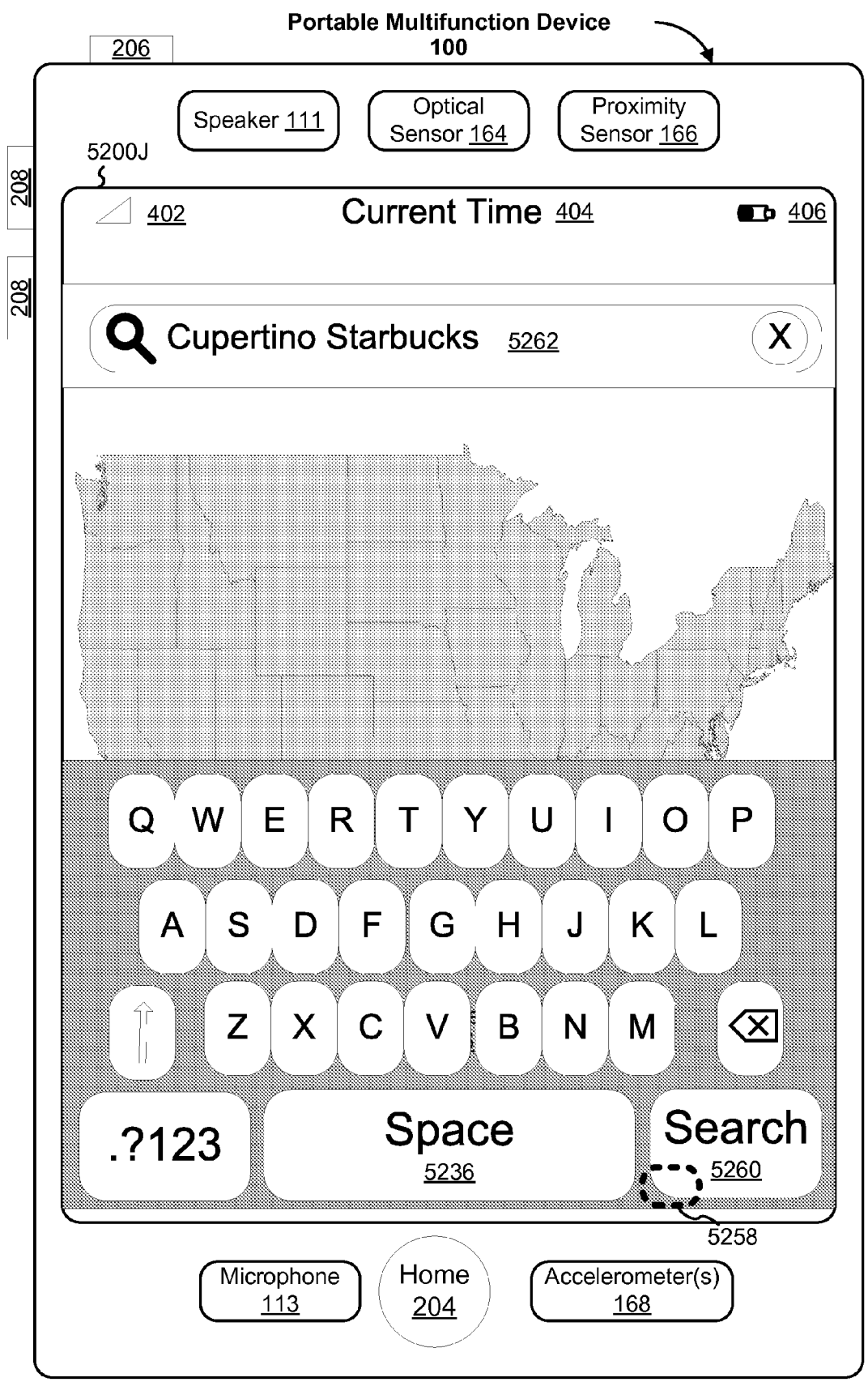

In some embodiments, in response to detecting a finger gesture 5238 (e.g., a finger tap gesture) on an input icon 5204 (FIG. 5A) associated with the search term input area 5202, the device displays a list 5240 (FIG. 5F) of bookmarked locations 5242. In response to detecting a finger gesture 5244 (e.g., a finger tap gesture) on a bookmarked location (e.g., 5242-3) in the list 5240 of bookmarked locations, an area corresponding to the bookmarked location is displayed on a digital map (not shown).

In some embodiments, in response to detecting a finger gesture 5238 (e.g., a finger tap gesture) on an input icon 5204 associated with the search term input area 5202, the device displays a list 5246 (FIG. 5H) of recent queries 5248 by a user. In response to detecting a finger gesture 5250 (e.g., a finger tap gesture) on a recent query (e.g., 5248-6) in the list 5246 of recent queries by a user, results corresponding to the recent query are displayed on a digital map (not shown).

In some embodiments, in response to detecting a finger gesture 5238 (e.g., a finger tap gesture) on an input icon 5204 (FIG. 5A) associated with the search term input area 5202, the device displays a list 5252 (FIG. 5J) of contacts 5254. In response to detecting a finger gesture 5256 (e.g., a finger tap gesture) on a contact (e.g., 5254-3) in the list of contacts, an area associated with the contact (e.g., an area that includes an address associated with the contact 5254-3 in the contact list) is displayed on a digital map (not shown).

In some embodiments, in response to detecting a finger gesture 5238 (e.g., a finger tap gesture) on an input icon 5204 (FIG. 5A) associated with the search term input area 5202, the device displays either:

a list 5240 (FIG. 5F) of bookmarked locations 5242, wherein in response to detecting a finger gesture 5244 (e.g., a finger tap gesture) on a bookmarked location (e.g., 5242-3) in the list 5240 of bookmarked locations, an area corresponding to the bookmarked location is displayed on a digital map (not shown);

a list 5246 (FIG. 5H) of recent queries 5248 by a user, wherein in response to detecting a finger gesture 5250 (e.g., a finger tap gesture) on a recent query (e.g., 5248-6) in the list 5246 of recent queries by a user, results corresponding to the recent query are displayed on a digital map (not shown); or a list 5252 (FIG. 5J) of contacts 5254, wherein in response to detecting a finger gesture 5256 (e.g., a finger tap gesture) on a contact (e.g., 5254-3) in the list of contacts, an area associated with the contact (e.g., an area that includes an address associated with the contact 5254-3 in the contact list) is displayed on a digital map (not shown).

In some embodiments, the list (i.e., 5240, 5246, or 5252) which is displayed in response to finger gesture 5238 (e.g., a finger tap gesture) on input icon 5204 corresponds to the list (i.e., 5240, 5246, or 5252) that was most recently displayed prior to finger gesture 5238.

Figure 5C:
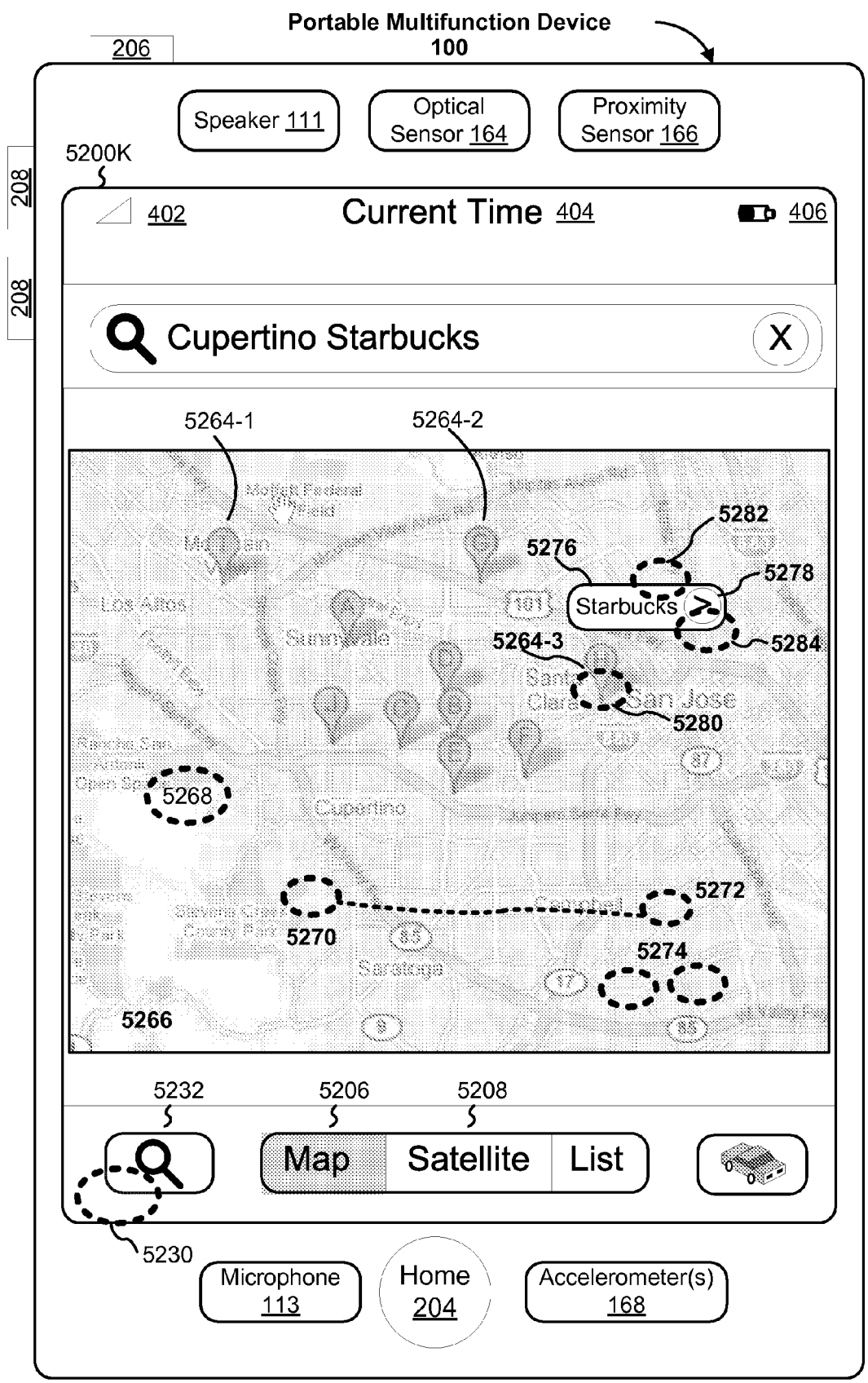

In some embodiments, in response to detecting a finger gesture 5258 (e.g., a finger tap gesture) on a search initiation icon 5260 (FIG. 5B), the device: sends one or more entered search terms 5262 (e.g., Cupertino Starbucks) to a remote computer (e.g., a map application server), receives one or more search results, and displays at least some of the search results 5264 on a digital map 5266 (FIG. 5C). In some embodiments, the digital map comprises a graphic image, a satellite image, or a hybrid combination of a graphic image and a satellite image. For example, the search results may be displayed on a graphical map if map icon 5206 is selected (FIG. 5C), whereas the search results may be displayed on a satellite image if satellite icon 5208 is selected.

In some embodiments, in response to detecting a single finger tap gesture 5268 (FIG. 5C) on the digital map, the device magnifies the area near the single finger tap gesture 5268. In some embodiments, the tap gesture is a single tap. In some embodiments, the tap gesture is a double tap. In some embodiments, the magnification includes a zoom-in animation.

In some embodiments, in response to detecting a finger down gesture 5270 and a finger drag gesture 5272 on the digital map 5266 (FIG. 5C), the device translates the digital map 5266 on the touch screen display in accordance with the finger drag gesture 5272.

In some embodiments, in response to detecting a two finger tap gesture 5274 (FIG. 5C) on the digital map, the device demagnifies the area near the two finger tap gesture 5274. In some embodiments, the tap gesture is a single tap. In some embodiments, the tap gesture is a double tap. In some embodiments, the demagnification includes a zoom-out animation.

Figure 5D:
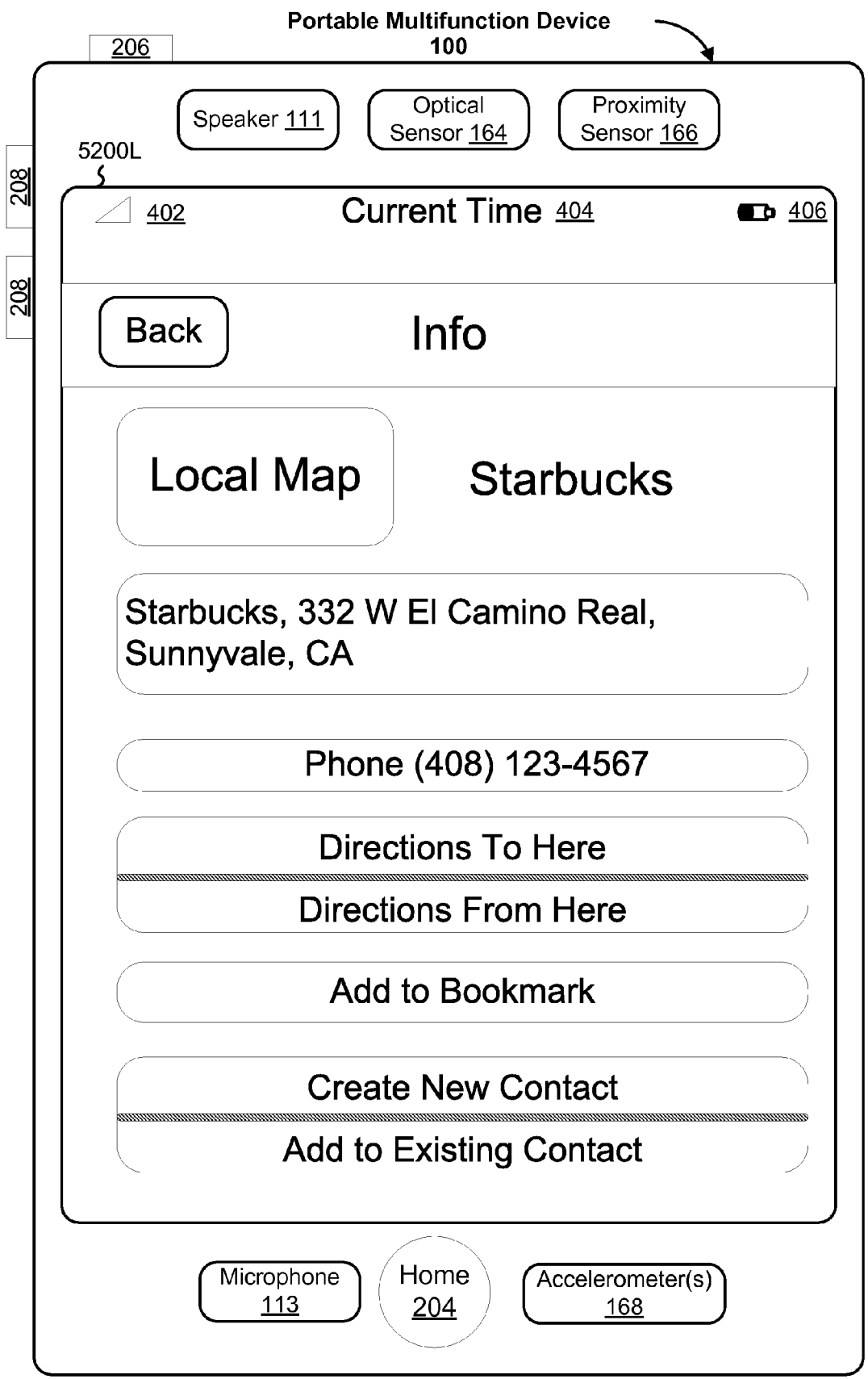

In some embodiments, a first respective icon (e.g., 5264-3, FIG. 5C) is displayed for a respective search result, wherein in response to detecting a finger gesture 5280 on the first respective icon, a second respective icon 5276 for the respective search result is displayed. In some embodiments, in response to detecting a finger gesture 5282 on the second respective icon, an interface 5200L (FIG. 5D) for the respective search result is displayed.

In some embodiments, a first respective icon (e.g., 5264-3, FIG. 5C) is displayed for a respective search result, wherein in response to detecting a finger gesture 5280 on the first respective icon, a second respective icon 5276 and a third respective icon 5278 for the respective search result are displayed. In some embodiments, in response to detecting a finger gesture 5280 on the second respective icon, the second respective icon and the third respective icon cease to be displayed. In some embodiments, in response to detecting a finger gesture 5284 on the third respective icon, an interface 5200L (FIG. 5D) for the respective search result is displayed.

In some embodiments, a respective icon (e.g., 5278) is displayed for a respective search result, wherein in response to detecting a finger gesture 5284 on the respective icon, an interface 5200L (FIG. 5D) is displayed for the respective search result.

Figure 5E:
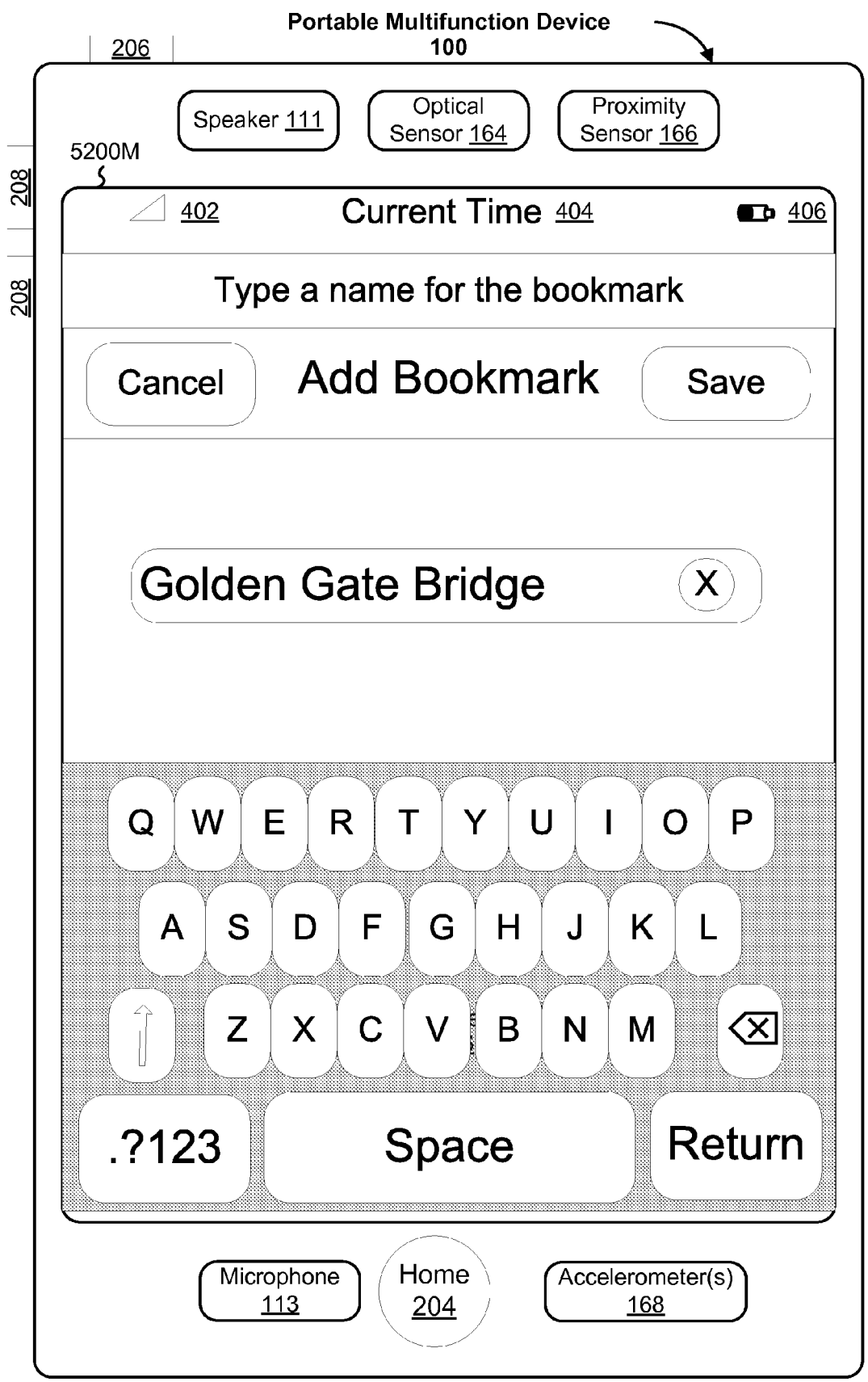
Figure 5F:
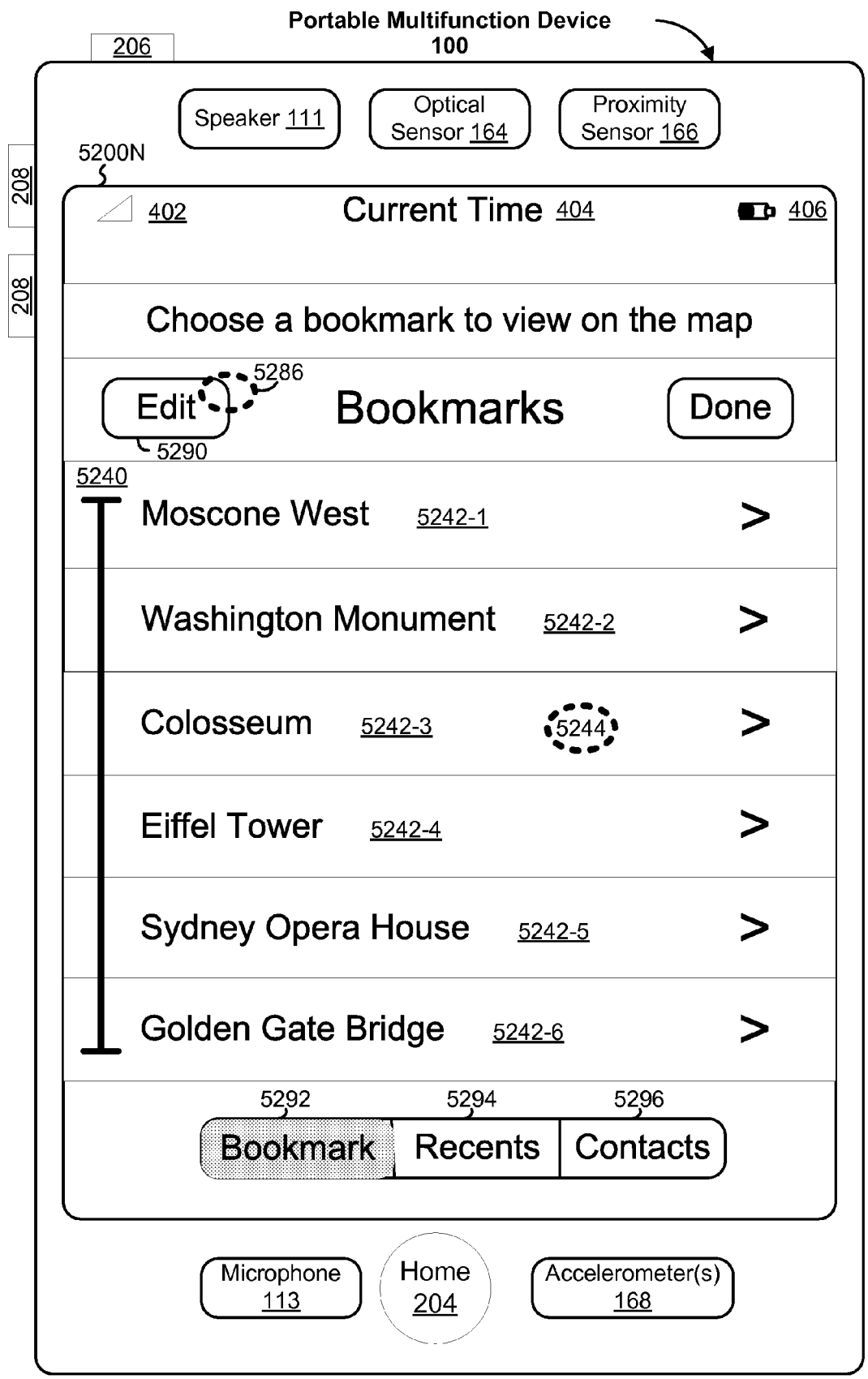
Figure 5G:
Figure 5H:
Figure 5I:
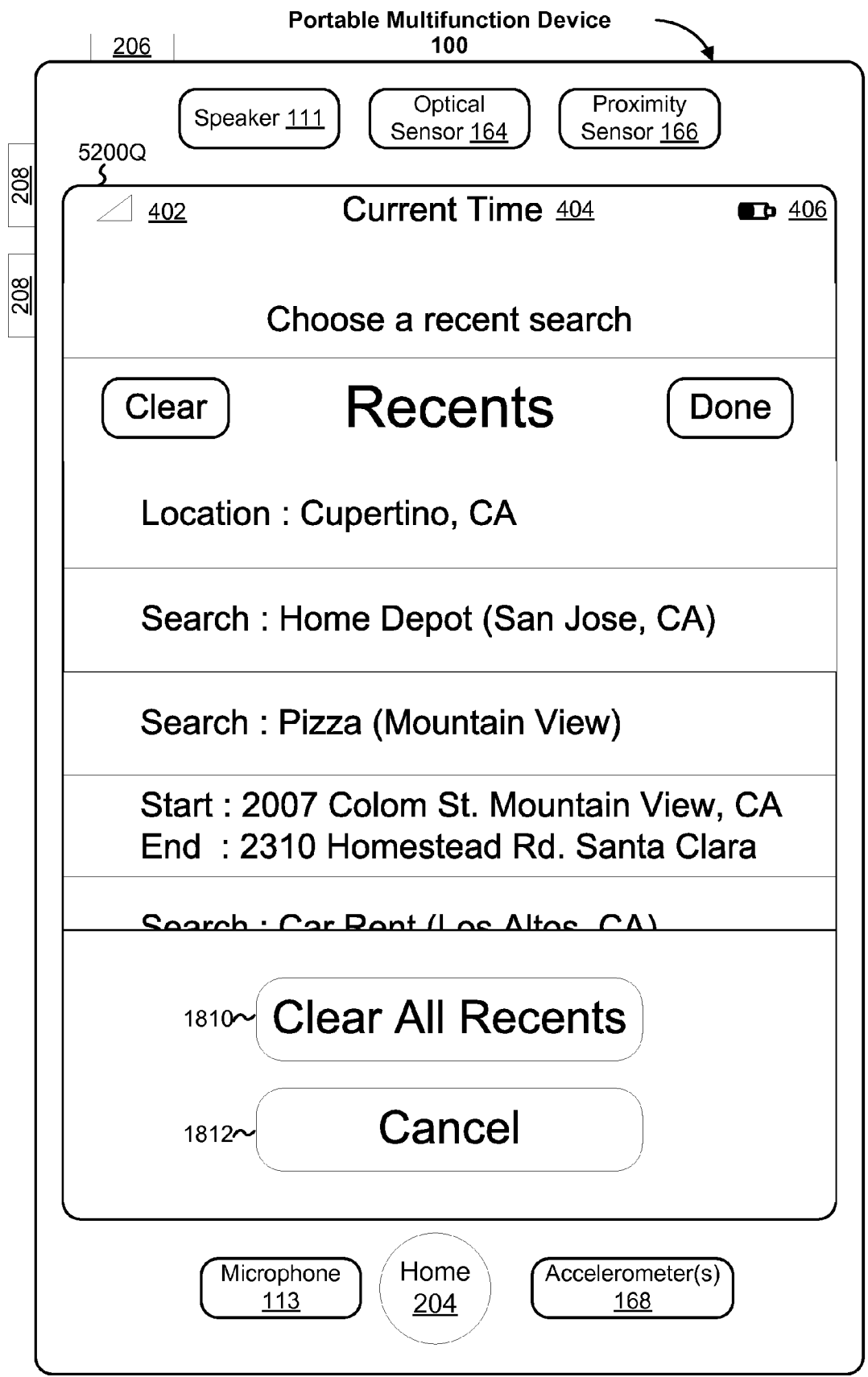
Figure 5J:
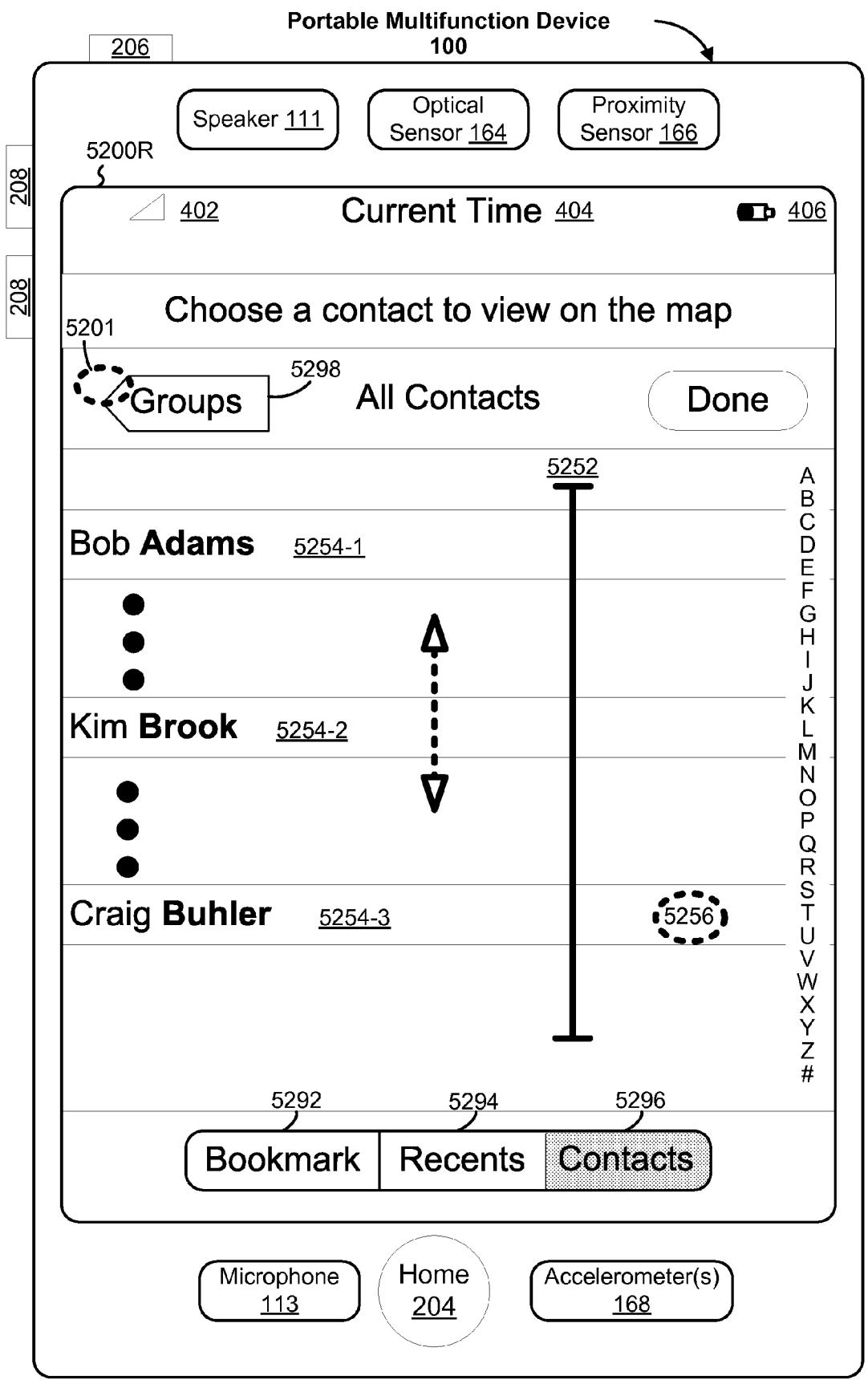

In some embodiments, the interface 5200L (FIG. 5D) for the respective search result includes:

a name for the respective search result;

a local map of the respective search result;

an electronic address for the respective search result (e.g., a URL);

a physical address for the respective search result;

a phone number associated with the respective search result, which when activated by a finger gesture initiates a phone call to the phone number;

an icon that when activated by a finger gesture enters the physical address as an end point in a request for directions (e.g., "Directions to here" icon);

an icon that when activated by a finger gesture enters the physical address as a starting point in a request for directions (e.g., "Directions from here" icon);

an icon that when activated by a finger gesture initiates creation of a bookmark for the respective search result (e.g., "Add to bookmarks" icon initiates creation of a bookmark via interface 5200M, FIG. 5E);

an icon that when activated by a finger gesture initiates creation of a contact list entry for the respective search result (e.g., "Create new contact" icon); and/or an icon that when activated by a finger gesture initiates addition of the respective search result to an existing contact (e.g., "Add to existing contact" icon);

In some embodiments, a bookmarks user interface 5200N (FIG. 5F) includes a list 5240 of locations bookmarked by a user. In some embodiments, in response to detecting a finger gesture 5286 on a configuration icon 5290 (e.g., Edit icon, FIG. 5F) for a list of bookmarks, the device displays respective deletion icons and/or respective moving-affordance icons for respective bookmarks in the list of bookmarks (FIG. 5G). Use of the deletion and moving-affordance icons is described in U.S. Provisional Patent Application Nos. 60/883,814, "Deletion Gestures on a Portable Multifunction Device," filed Jan. 7, 2007, and 60/883,808, "System and Method for Managing Lists," filed Jan. 7, 2007, which applications are incorporated by reference herein in their entirety.

In some embodiments, a user interface 5200P (FIG. 5H) includes a list of recent location, search, and/or route queries (collectively, a list of recent queries) by a user. In some embodiments, in response to a finger gesture (e.g., a finger tap gesture) on a recent location query, the location is displayed on a digital map or entered as a start or end point in a route search query, depending on context. In some embodiments, in response to a finger gesture (e.g., a finger tap gesture) on a recent search query, the results of the recent search query are displayed on a digital map. In some embodiments, in response to a finger gesture (e.g., a finger tap gesture) on a recent route query, at least a portion of the corresponding routing instructions (e.g., driving directions) are displayed.

Figure 5K:
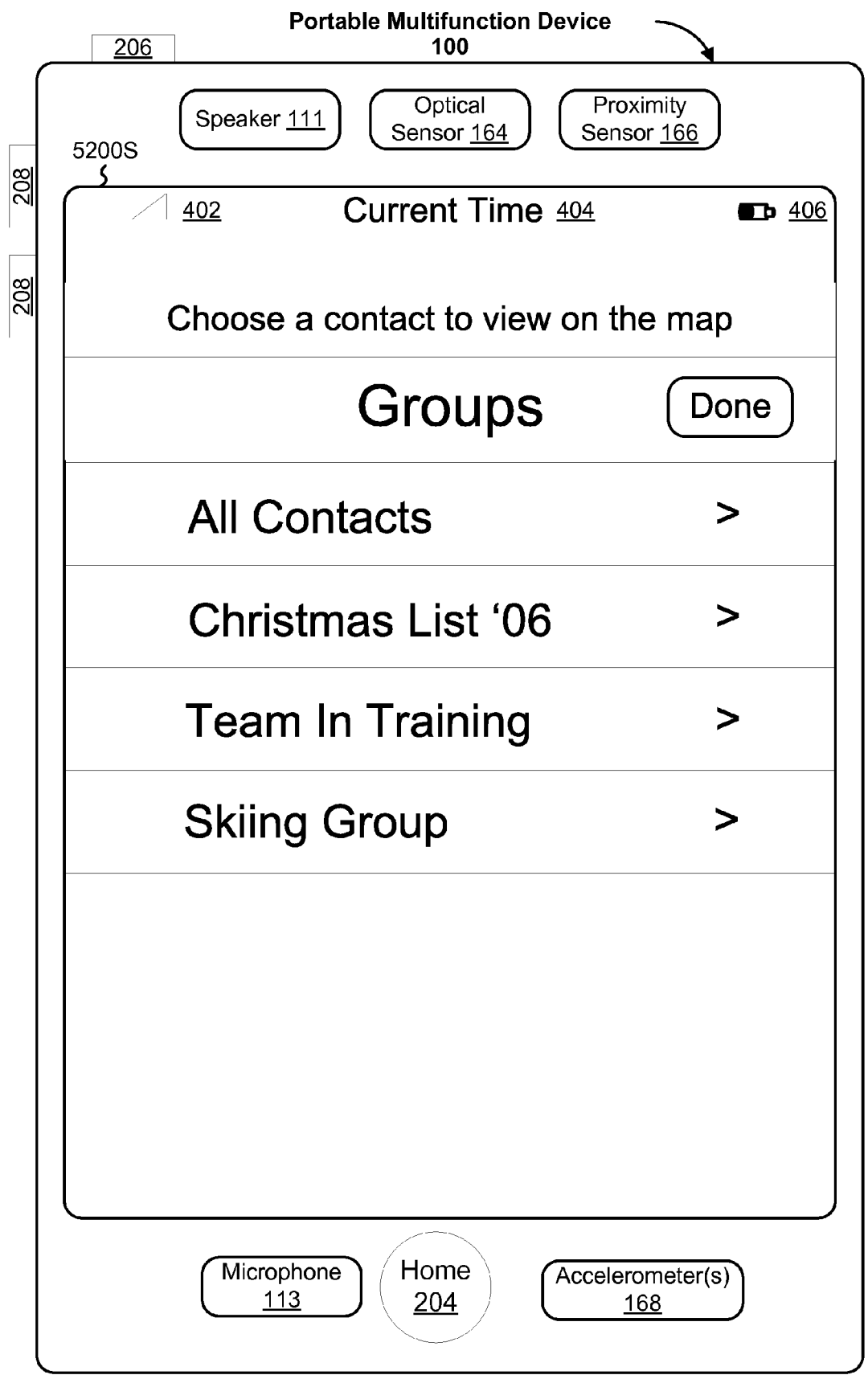
Figure 5L:
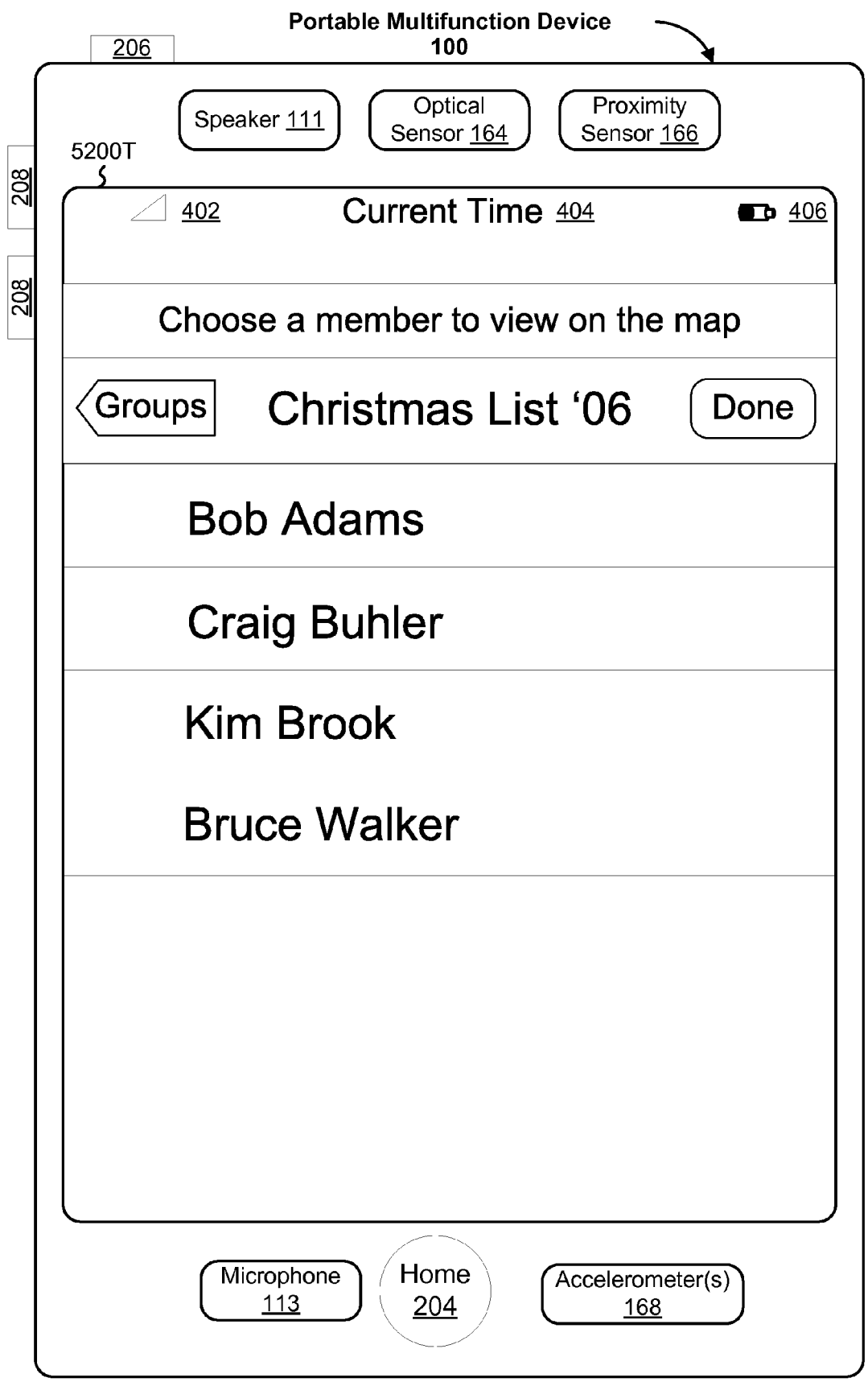

In some embodiments, a contacts UI 5200P (FIG. 5J) includes a list of individual contacts 5254 and an icon 5298 that when activated by a finger gesture 5201 displays a list of groups of contacts (e.g., UI 5200S, FIG. 5K) In some embodiments, in response to detecting a finger gesture 5256 on a contact in the list of contacts, an area associated with the contact (e.g., an area that includes an address associated with the contact in the contact list) is displayed on a digital map.

Figure 5M:
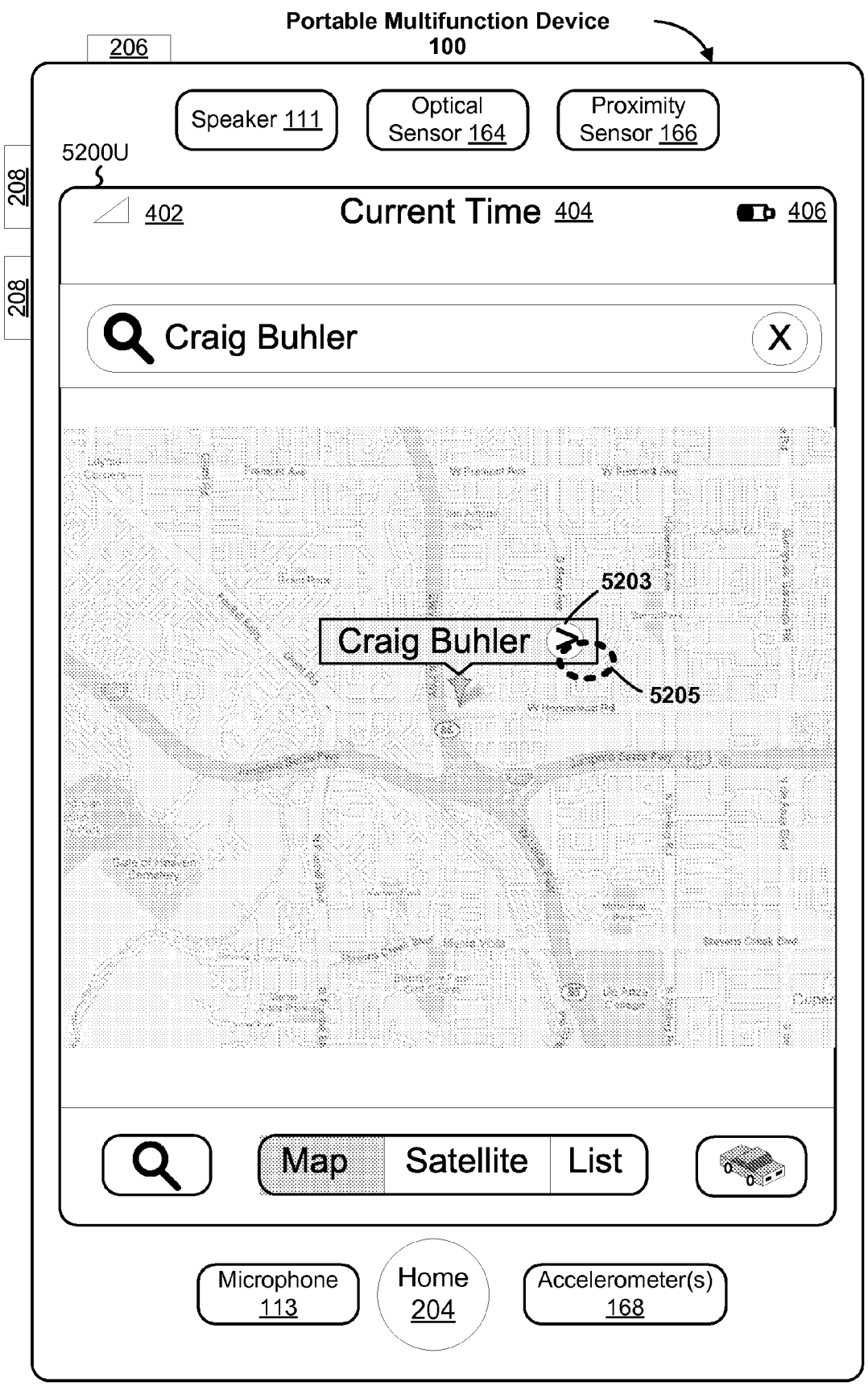
Figure 5N:
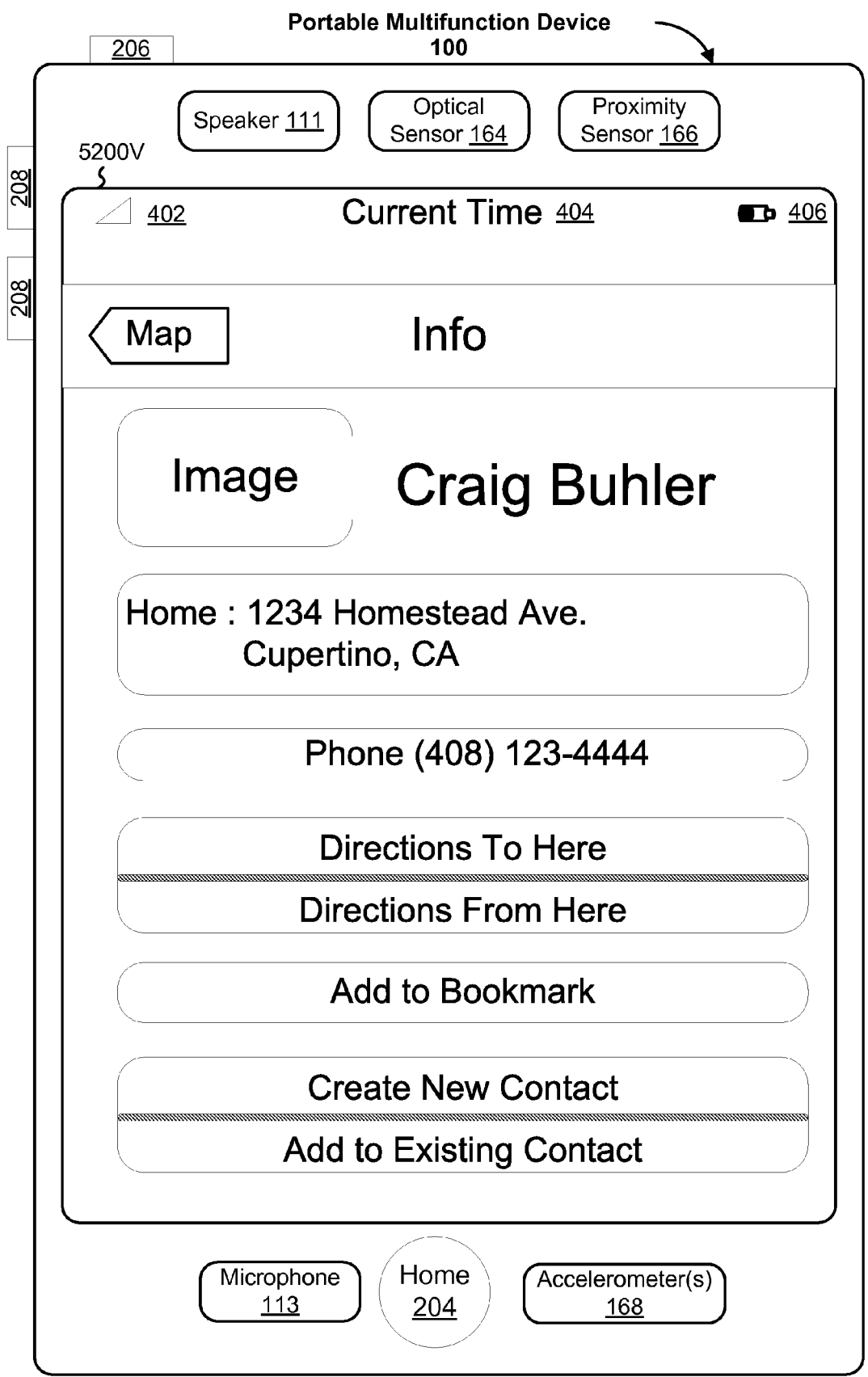

In some embodiments, a respective icon (e.g., icon 5203, FIG. 5M) is displayed for a contact, wherein in response to detecting a finger gesture 5205 on the respective icon, an interface 5200V (FIG. 5N) is displayed for the contact.

Figure 5O:
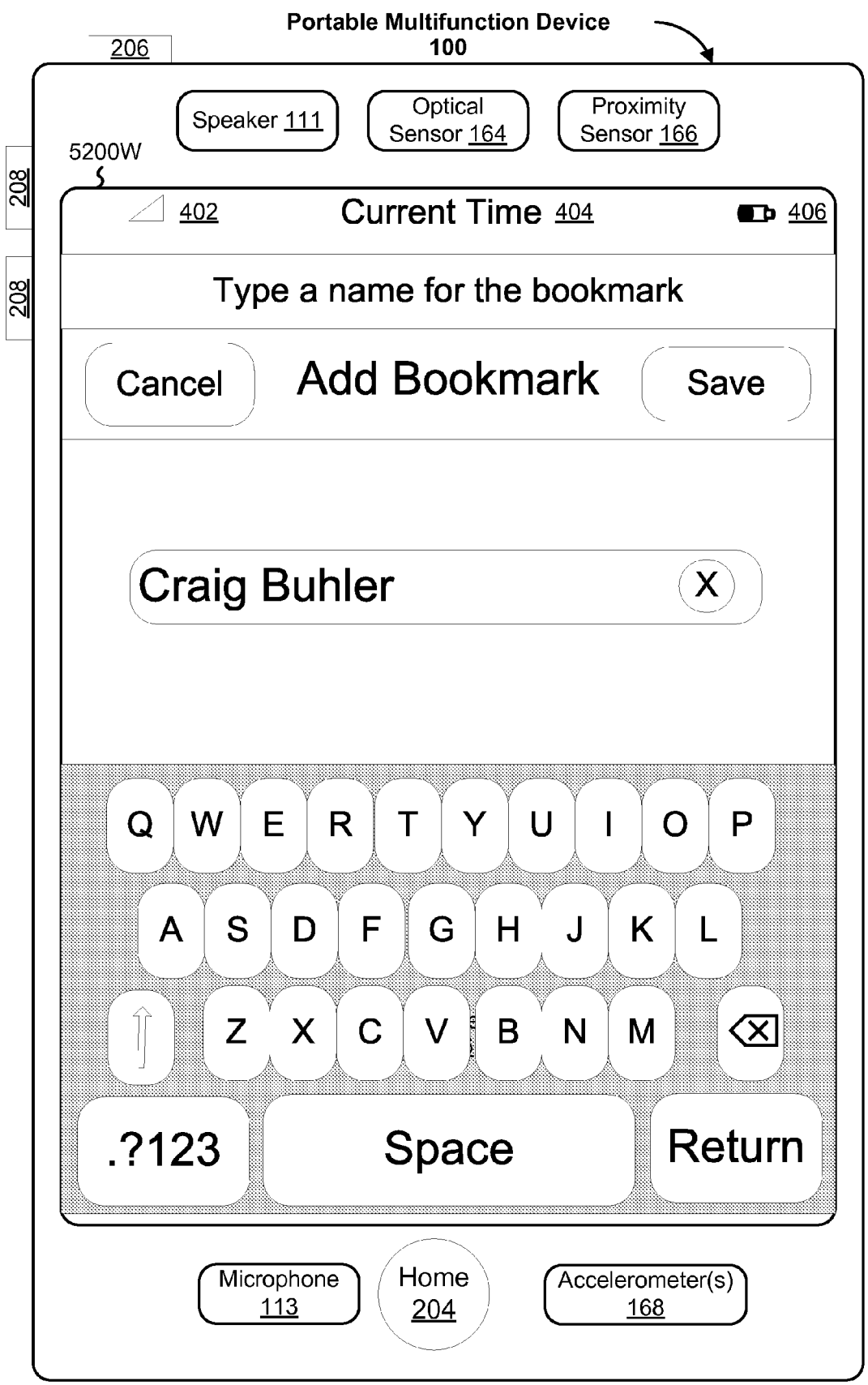

In some embodiments, the interface 5200V for the contact includes:

a name for the contact (e.g., Craig Buhler);
a physical address for the contact;
an image associated with the contact;
an electronic address for the contact (e.g., a URL);
a phone number associated with the contact;
an icon that when activated by a finger gesture enters the physical address for the contact as an end point in a request for directions (e.g., "Directions to here" icon);
an icon that when activated by a finger gesture enters the physical address for the contact as a starting point in a request for directions (e.g., "Directions from here" icon); and/or
an icon that when activated by a finger gesture initiates creation of a bookmark for the contact (e.g., "Add to bookmarks" icon initiates creation of a bookmark via interface 5200W, FIG. 5O).

In some embodiments, in response to finger contacts on icons 5292, 5294, and 5296 in the user interfaces for bookmarks (UI 5200N, FIG. 5F), recent queries (UI 5200P, FIG. 5H), and contacts (UI 5200R, FIG. 5J), the device displays the corresponding user interface, which makes navigating between these interfaces simple and intuitive.

Figure 5P:
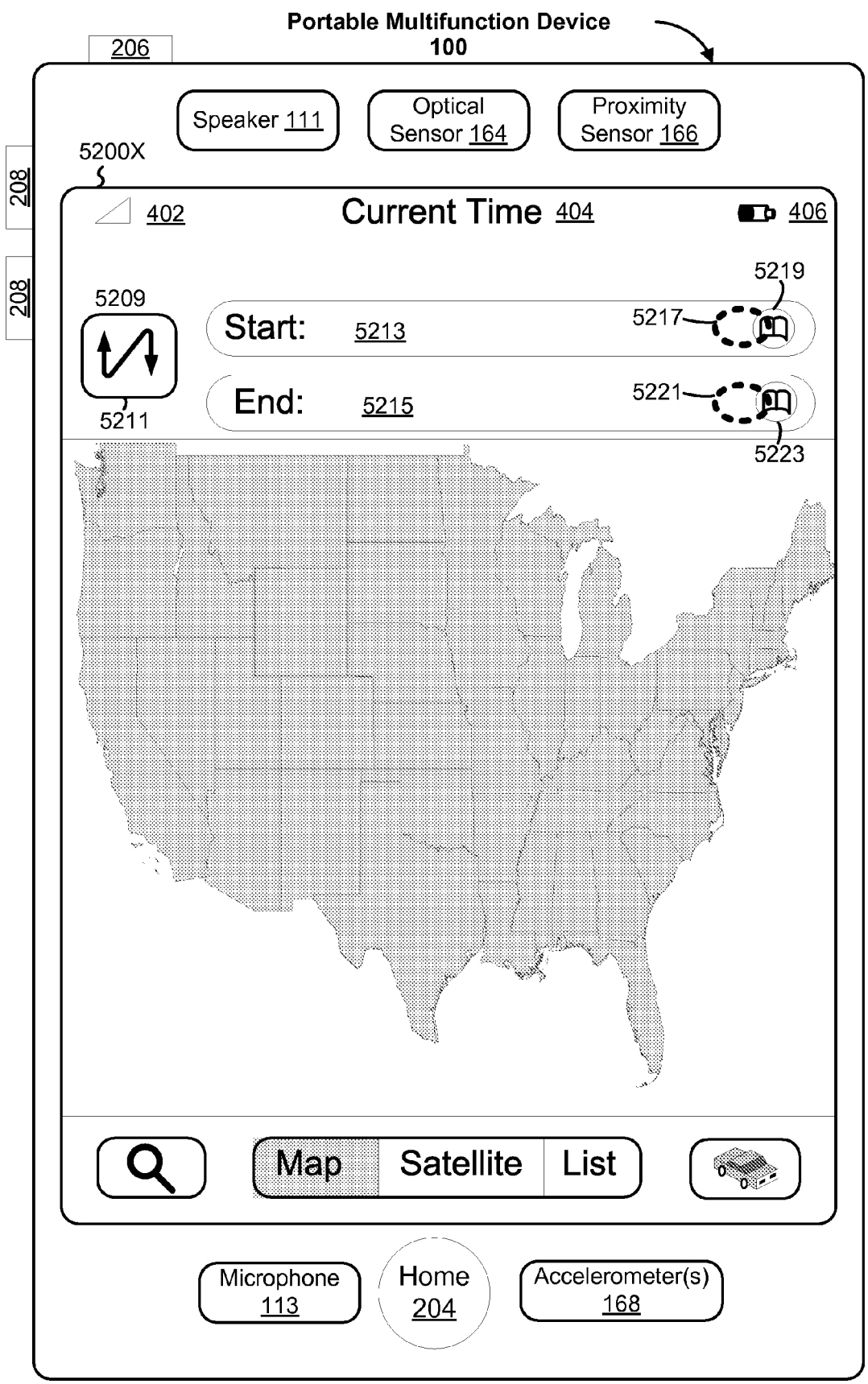

In some embodiments, in response to detecting a finger gesture on a route search icon 5207 (FIG. 5A), the device displays an endpoints area 5209 (FIG. 5P) comprising:

a first area 5213 for entering a first location;
a second area 5215 for entering a second location;
and an icon 5211 for swapping information in the first area 5213 with information in the second area 5215.

Figure 5Q:
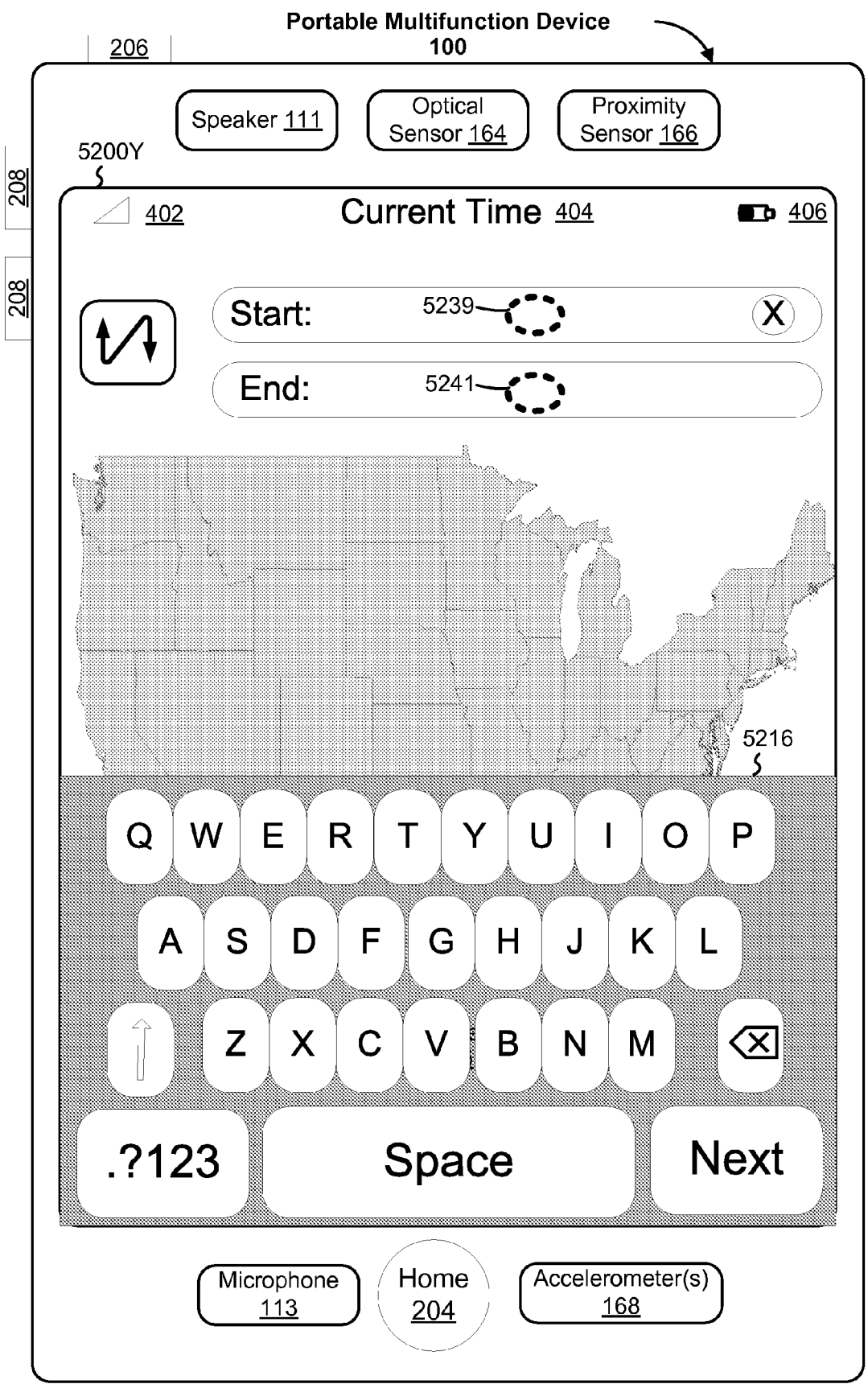

In some embodiments, in response to detecting a finger gesture 5239 (FIG. 5Q) (e.g., a finger tap gesture) on the first area ("Start:"), the device displays a keyboard for entering the first location (FIG. 5Q). In some embodiments, in response to detecting a finger gesture 5241 (e.g., a finger tap gesture) on the second area ("End:"), the device displays a keyboard for entering the second location.

In some embodiments, in response to detecting a finger gesture 5217 (FIG. 5P) (e.g., a finger tap gesture) on an input icon 5219 associated with the first area 5213, the device displays:

a list 5240 (FIG. 5F) of bookmarked locations, wherein in response to detecting a finger gesture (e.g., 5244) on a bookmarked location (e.g., 5242-3) in the list of bookmarked locations, an address or name corresponding to the bookmarked location (e.g., 5242-3) is entered in the first area;

a list 5246 (FIG. 5H) of recent searches, wherein in response to detecting a finger gesture on a location in the list of recent searches, an address corresponding to the location is entered in the first area; or a list 5252 (FIG. 5J) of contacts, wherein in response to detecting an finger gesture on a contact 5254 in the list of contacts, an address associated with the contact (e.g., an address associated with the contact in the contact list) is entered in the first area.

In some embodiments, in response to detecting a finger gesture 5221 (FIG. 5P) (e.g., a finger tap gesture) on an input icon 5223 associated with the second area 5215, the device displays:

a list 5240 (FIG. 5F) of bookmarked locations, wherein in response to detecting a finger gesture (e.g., 5244) on a bookmarked location (e.g., 5242-3) in the list of bookmarked locations, an address or name corresponding to the bookmarked location (e.g., 5242-3) is entered in the second area;

a list 5246 (FIG. 5H) of recent searches, wherein in response to detecting a finger gesture on a location in the list of recent searches, an address corresponding to the location is entered in the second area; or a list 5252 (FIG. 5J) of contacts, wherein in response to detecting an finger gesture on a contact 5254 in the list of contacts, an address associated with the contact (e.g., an address associated with the contact in the contact list) is entered in the second area.

Figure 5R:
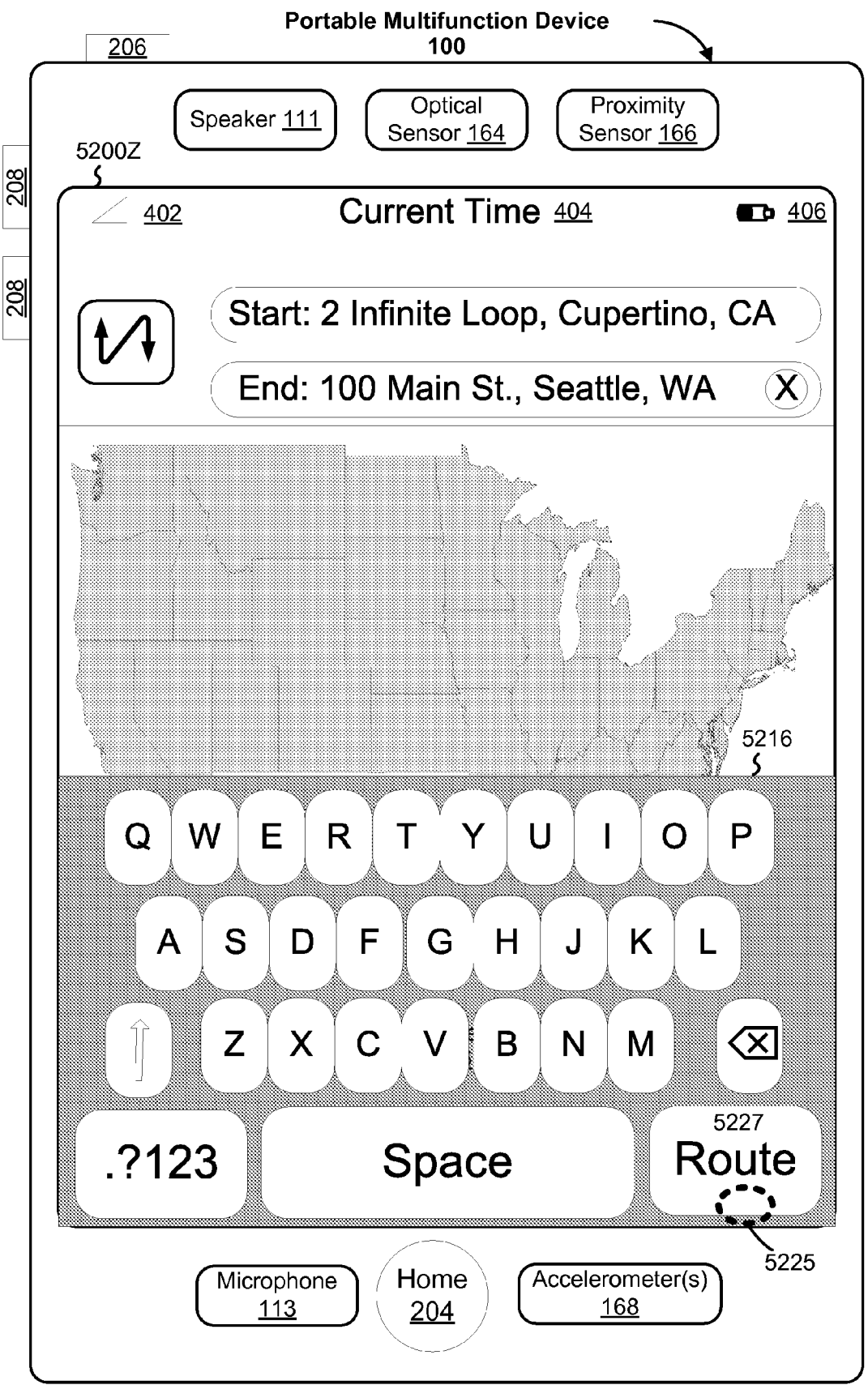
Figure 5S:
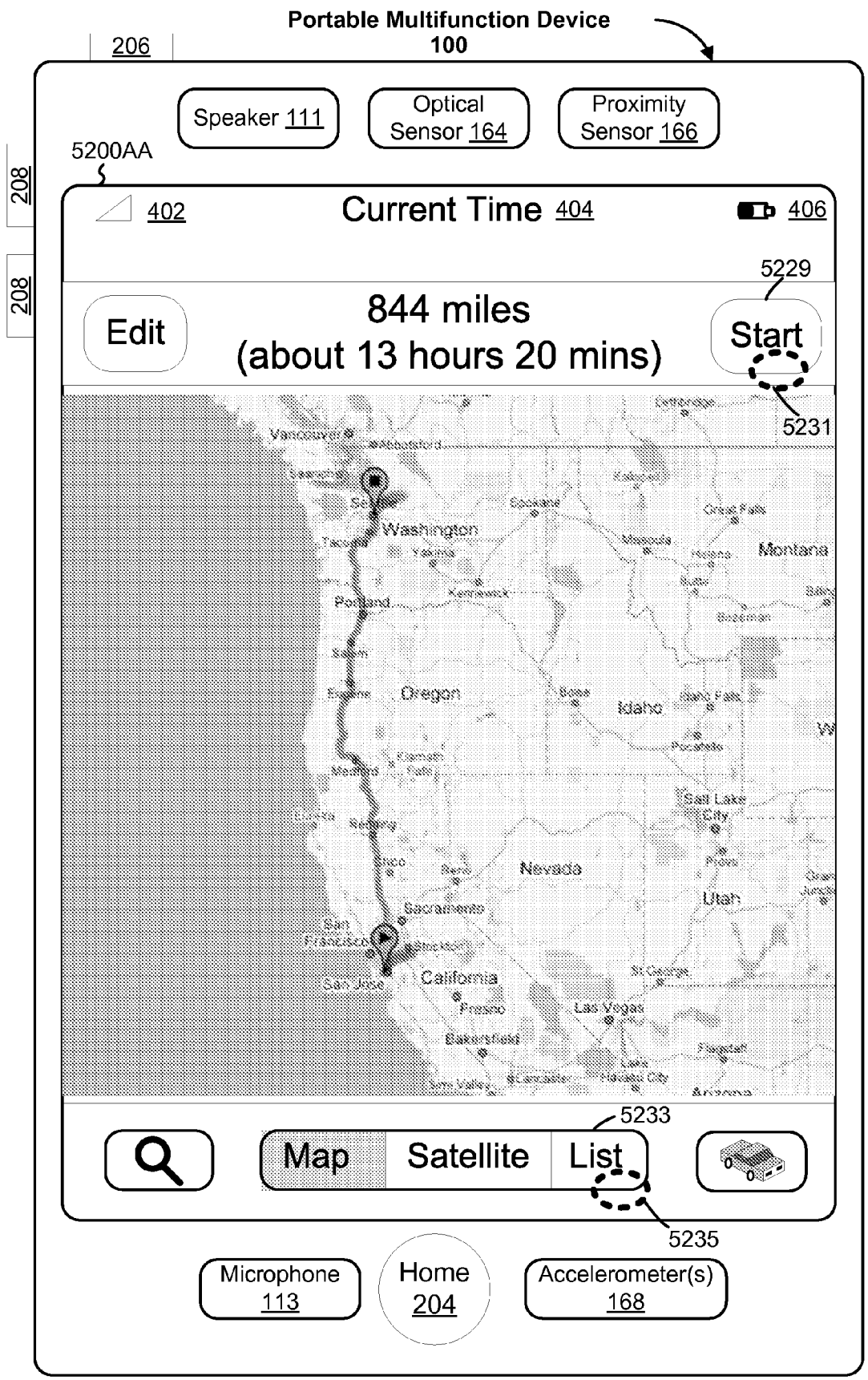

In some embodiments, in response to detecting a finger gesture 5225 (FIG. 5R) on a route search initiation icon 5227, the device: sends the first location (e.g., 2 Infinite Loop, Cupertino, Calif.) and the second location (e.g., 100 Main St., Seattle, Wash.) to a remote computer (e.g., a map application server, such as Google maps); receives routing information between the first location and the second location; and displays at least some of the routing information between the first location and the second location on a digital map (e.g., FIGS. 5S-5AA)

In some embodiments, the received routing information includes all of the digital map information needed to display the waypoints in the route between the first location and the second location. In some embodiments, the received routing information is stored (e.g., cached) so that the device can display the routing information even if the device loses access to the remote computer.

Figure 5T:
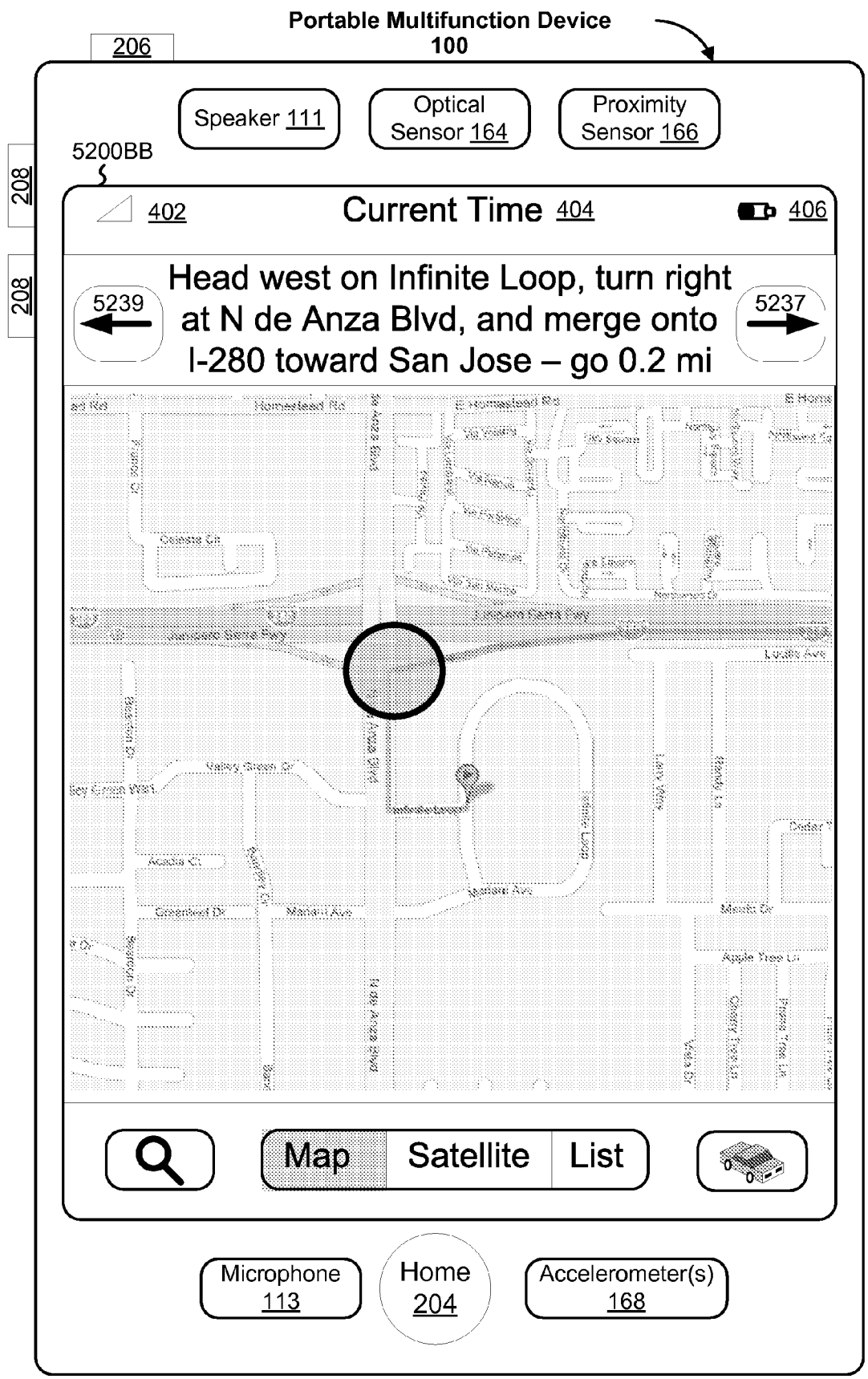
Figure 5U:
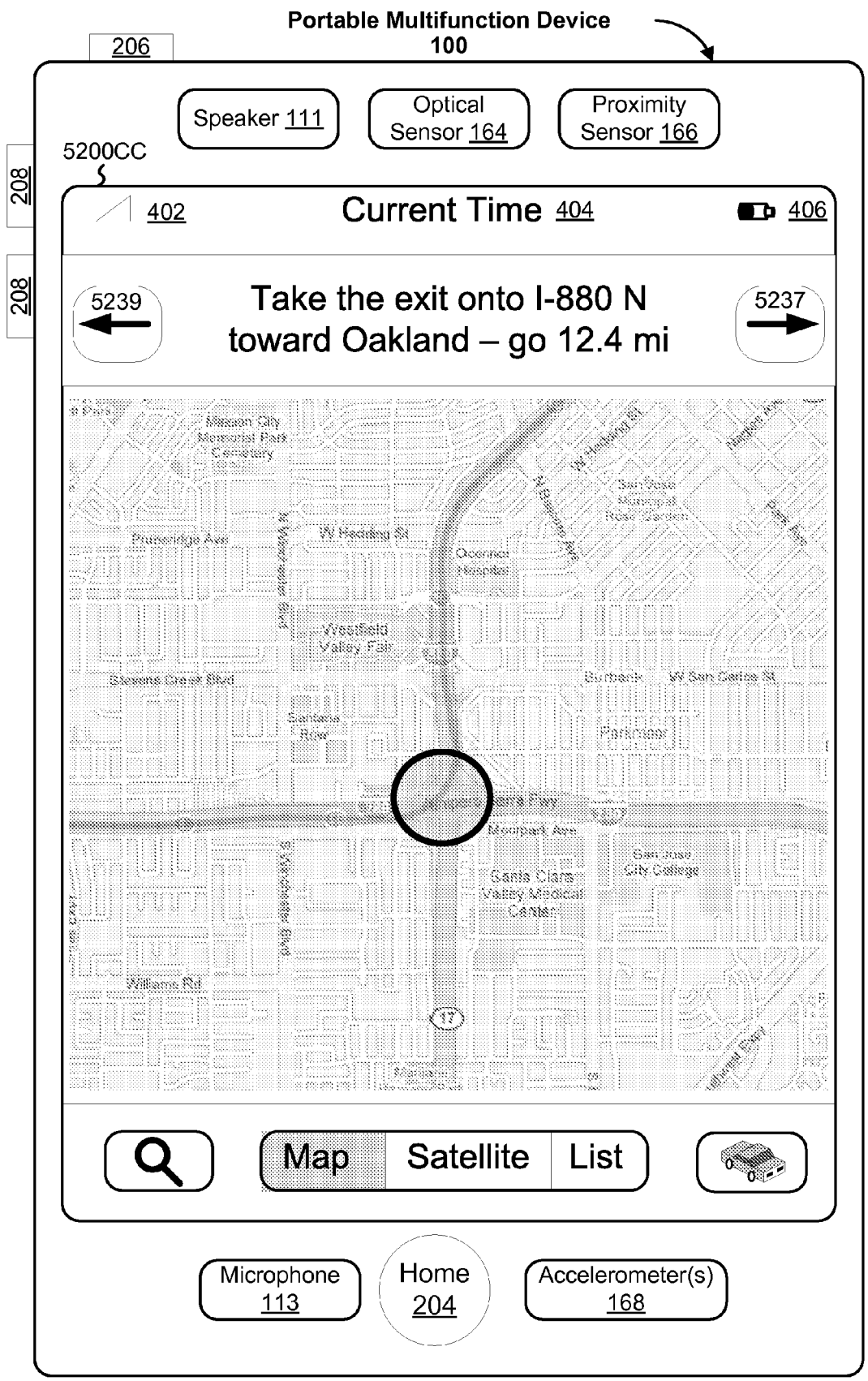
Figure 5V:
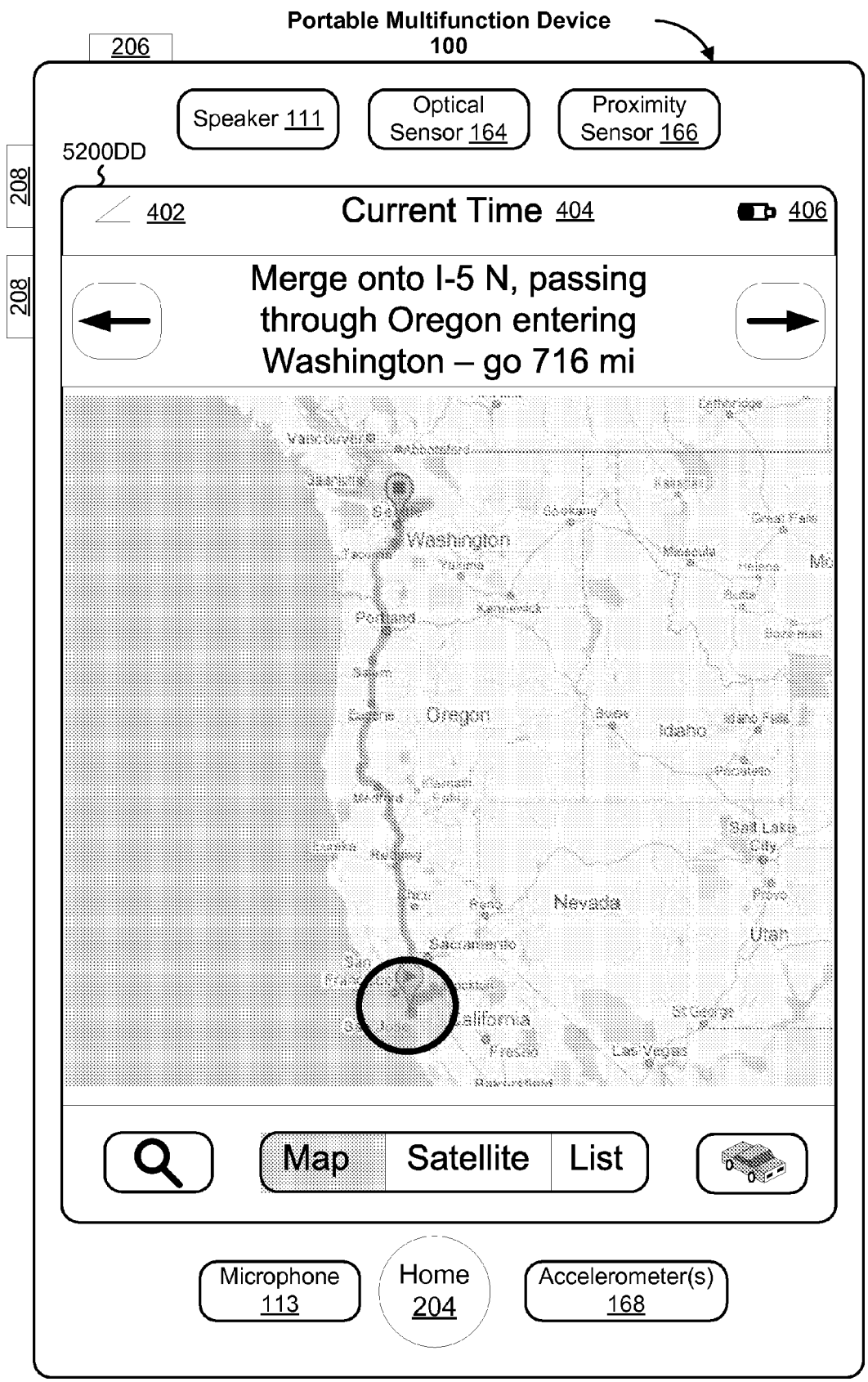
Figure 5W:
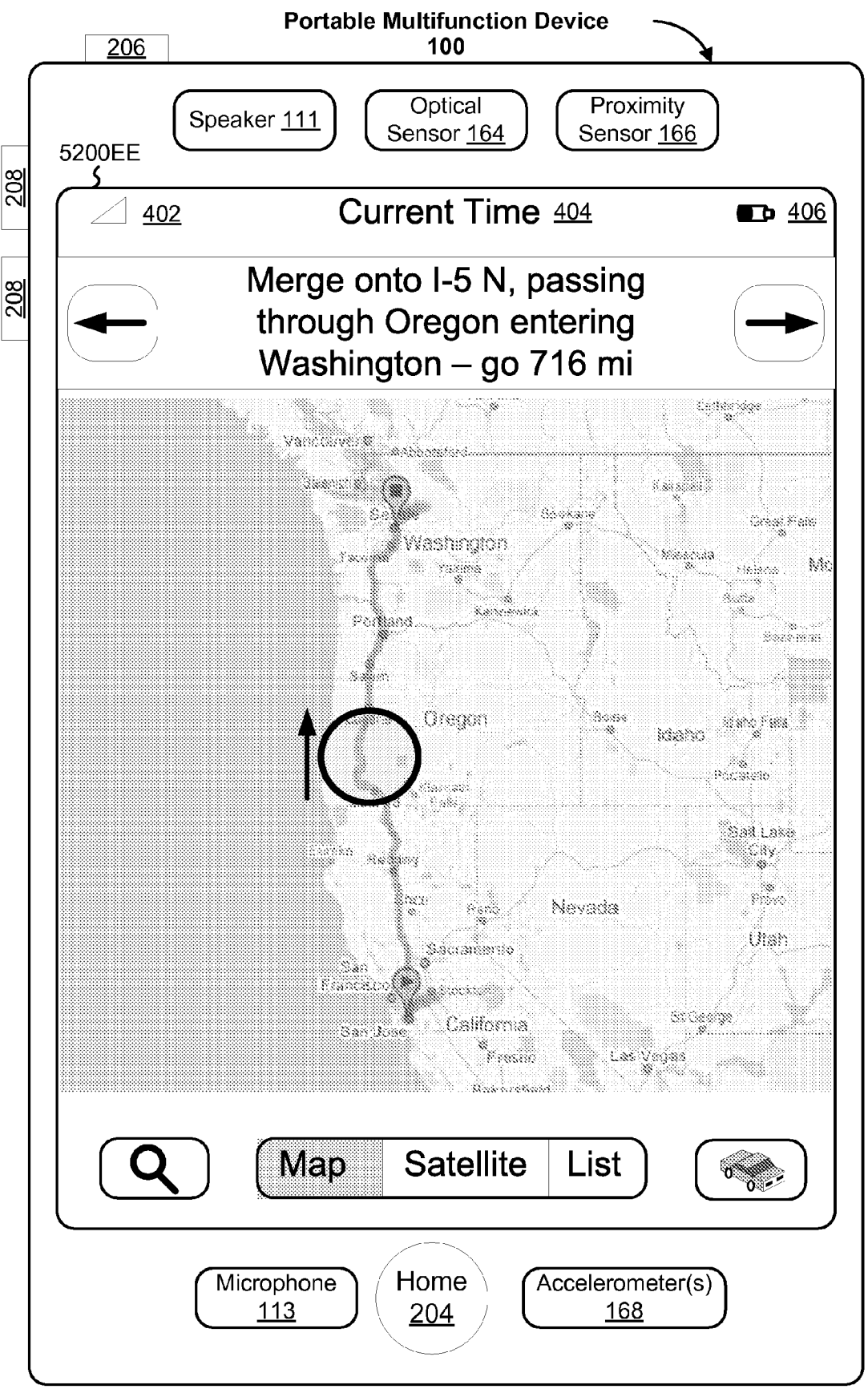
Figure 5X:
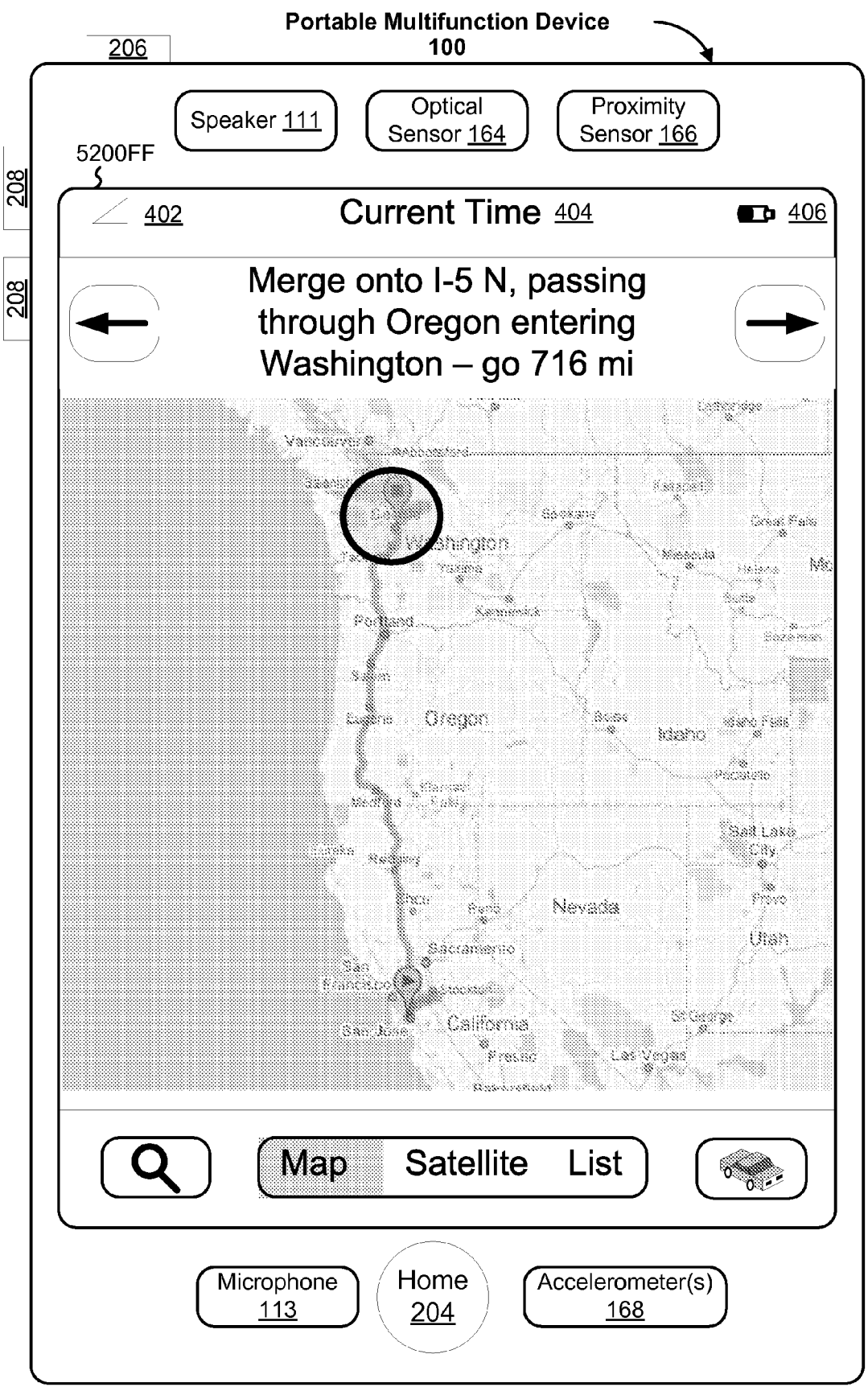
Figure 5Y:
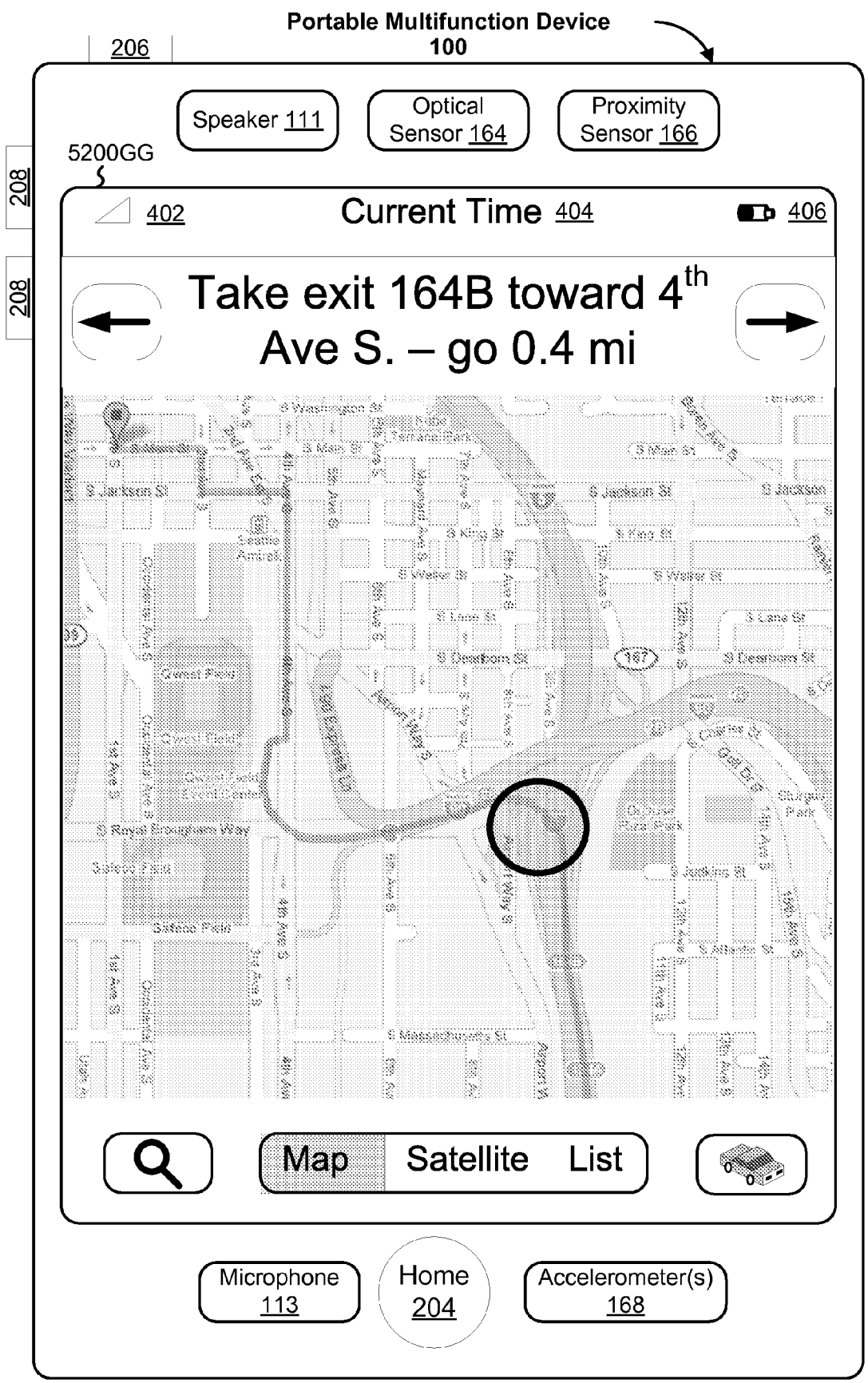
Figure 5Z:
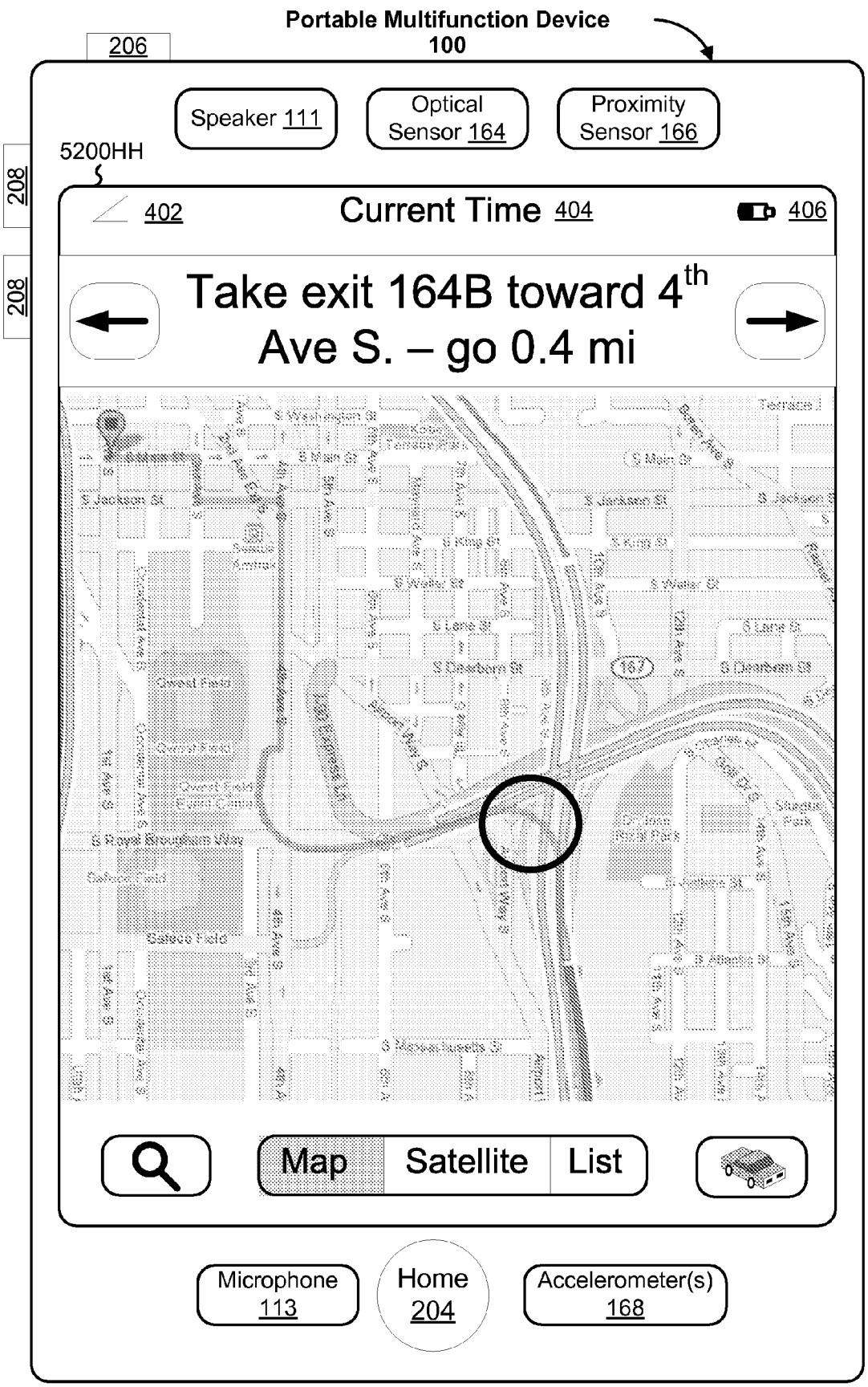
Figure 5A:
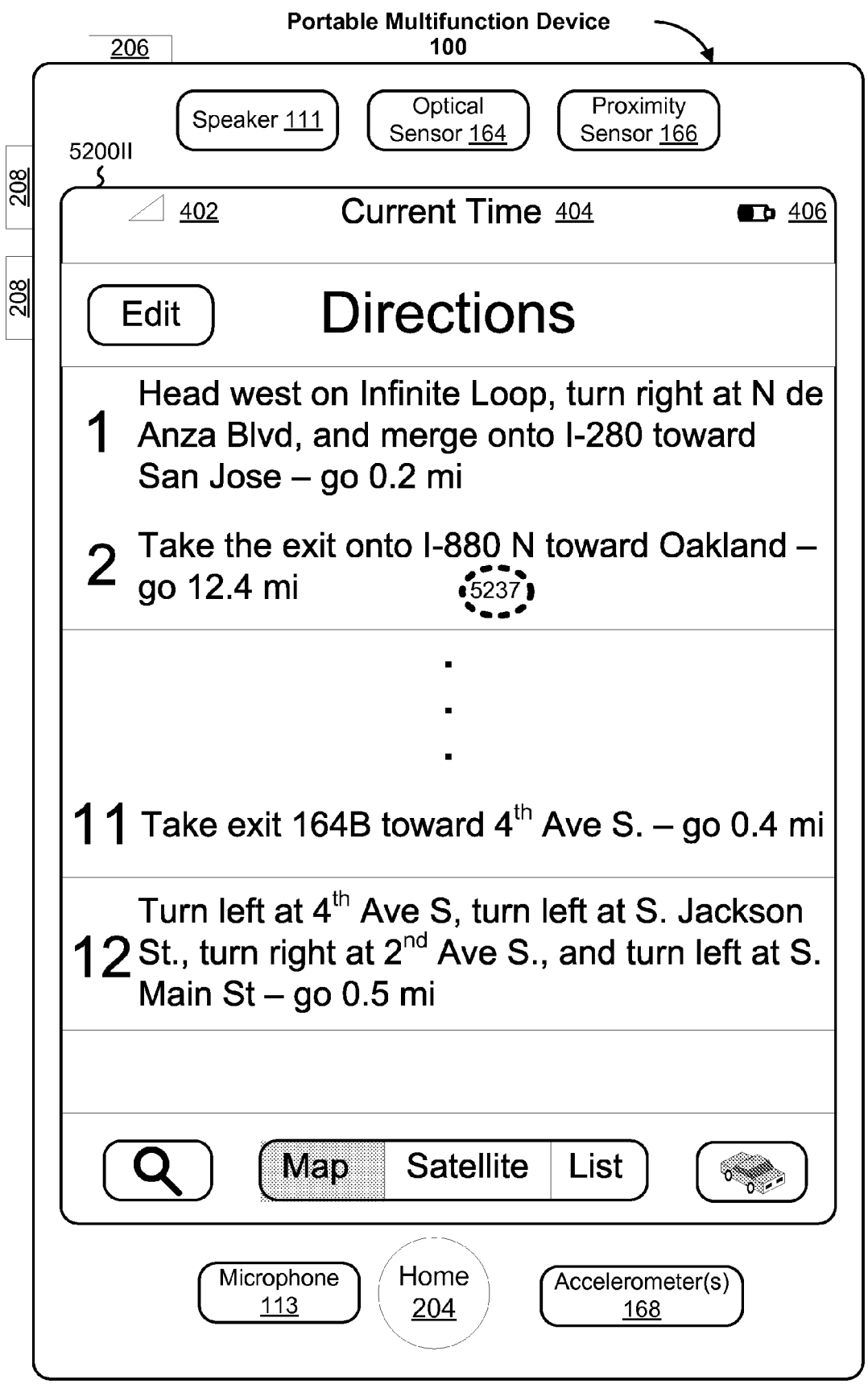

In some embodiments, in response to detecting a finger gesture 5231 (e.g., a finger tap gesture) on a start icon 5229, the device displays the first location and the first portion of the routing information (FIG. 5T). Similarly, in some embodiments, in response to detecting a finger gesture (e.g., a finger tap gesture) on a next waypoint icon 5237, the device displays the next waypoint and the corresponding map information (FIGS. 5T-5Z). In some embodiments, in response to detecting a finger gesture (e.g., a finger tap gesture) on a previous waypoint icon 5239, the device displays the previous waypoint and the corresponding map information.

In some embodiments, if the distance to the next waypoint is large relative to the area displayed around a waypoint on the digital map, the user interface may zoom out, display an animated movement to the next waypoint, and then zoom back in to the next waypoint, as illustrated in FIGS. 5U-5Y.

In some embodiments, in response to detecting a finger gesture 5235 (e.g., a finger tap gesture) on a list icon 5233, the device displays an itemized list of the routing information (e.g., turn-by-turn driving directions), as shown in UI 5200II (FIG. 5AA). In some embodiments, in response to detecting a finger gesture 5237 (e.g., a finger tap gesture) on a particular item in the list, the corresponding portion of routing information is shown on a digital map (e.g., UI 5200II, FIG. 5U).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:

at a computing device with a touch screen display:
displaying a map application, wherein the map application is configured to separately display a list of bookmarked locations, a list of recent map-related queries by a user, wherein the list of recent map-related queries includes at least one entry that simultaneously displays a start point and an end point for directions, and a list of contacts for the user; and
in response to detecting a finger gesture on an input icon associated with a search term input area while no text is entered in the search term input area:
if the list of bookmarked locations was displayed more recently than the list of recent map-related queries by the user and the list of contacts prior to the finger gesture on the input icon associated with the search term input area, simultaneously displaying the list of bookmarked locations and a bookmark list display icon, a recent map-related query list display icon, and a contact list display icon, wherein in response to detecting a finger gesture on a bookmarked location in the list of bookmarked locations, an area corresponding to the bookmarked location is displayed on a digital map;
if the list of recent map-related queries by the user was displayed more recently than the list of bookmarked locations and the list of contacts prior to the finger gesture on the input icon associated with the search term input area, simultaneously displaying the list of recent map-related queries by the user and the bookmark list display icon, the recent map-related query list display icon, and the contact list display icon, wherein in response to detecting a finger gesture on a recent map-related query in the list of recent map-related queries by the user, one or more results corresponding to the recent map-related query are displayed on a digital map; and
if the list of contacts was displayed more recently than the list of recent map-related queries by the user and the list of bookmarked locations prior to the finger gesture on the input icon associated with the search term input area, simultaneously displaying the list of contacts for the user and the bookmark list display icon, the recent map-related query list display icon, and the contact list display icon, wherein in response to detecting a finger gesture on a contact in the list of contacts, an area associated with the contact is displayed on a digital map.

2. The method of claim 1, including:
in response to detecting a finger gesture on the search term input area, displaying a keyboard for entering the one or more search terms; and
in response to detecting a finger gesture on a search initiation icon:
sending the one or more entered search terms to a remote computer,
receiving one or more search results, and
displaying at least some of the search results on a digital map.

3. A computing device, comprising:
a touch screen display;
one or more processors;
memory; and
one or more programs, wherein the one or more programs are stored in the memory and configured to be executed by the one or more processors, the one or more programs including instructions for:
displaying a map application, wherein the map application is configured to separately display a list of bookmarked locations, a list of recent map-related queries by a user, wherein the list of recent map-related queries includes at least one entry that simultaneously displays a start point and an end point for directions, and a list of contacts for the user; and
in response to detecting a finger gesture on an input icon associated with a search term input area while no text is entered in the search term input area:
if the list of bookmarked locations was displayed more recently than the list of recent map-related queries by the user and the list of contacts prior to the finger gesture on the input icon associated with the search term input area, simultaneously displaying the list of bookmarked locations and a bookmark list display icon, a recent map-related query list display icon, and a contact list display icon, wherein in response to detecting a finger gesture on a bookmarked location in the list of bookmarked locations, an area corresponding to the bookmarked location is displayed on a digital map;
if the list of recent map-related queries by the user was displayed more recently than the list of bookmarked locations and the list of contacts prior to the finger gesture on the input icon associated with the search term input area, simultaneously displaying the list of recent map-related queries by the user and the bookmark list display icon, the recent map-related query list display icon, and the contact list display icon wherein in response to detecting a finger gesture on a recent map-related query in the list of recent map-related queries by the user, one or more results corresponding to the recent map-related query are displayed on a digital map; and
if the list of contacts was displayed more recently than the list of recent map-related queries by the user and the list of bookmarked locations prior to the finger gesture on the input icon associated with the search term input area, simultaneously displaying the list of contacts for the user and the bookmark list display icon, the recent map-related query list display icon, and the contact list display icon, wherein in response to detecting a finger gesture on a contact in the list of contacts, an area associated with the contact is displayed on a digital map.

4. A non-transitory computer readable storage medium having stored therein instructions, which when executed by a device with a touch screen display, cause the device to:
display a map application, wherein the map application is configured to separately display a list of bookmarked locations, a list of recent map-related queries by a user, wherein the list of recent map-related queries includes at least one entry that simultaneously displays a start point and an end point for directions, and a list of contacts for the user; and
in response to detecting a finger gesture on an input icon associated with a search term input area while no text is entered in the search term input area:
if the list of bookmarked locations was displayed more recently than the list of recent map-related queries by the user and the list of contacts prior to the finger gesture on the input icon associated with the search term input area, simultaneously display the list of bookmarked locations and a bookmark list display icon, a recent map-related query list display icon, and a contact list display icon, wherein in response to detecting a finger gesture on a bookmarked location in the list of bookmarked locations, an area corresponding to the bookmarked location is displayed on a digital map;

if the list of recent map-related queries by the user was displayed more recently than the list of bookmarked locations and the list of contacts prior to the finger gesture on the input icon associated with the search term input area, simultaneously display the list of recent map-related queries by the user and the bookmark list display icon, the recent map-related query list display icon, and the contact list display icon, wherein in response to detecting a finger gesture on a recent map-related query in the list of recent map-related queries by the user, one or more results corresponding to the recent map-related query are displayed on a digital map; and if the list of contacts was displayed more recently than the list of recent map-related queries by the user and the list of bookmarked locations prior to the finger gesture on the input icon associated with the search term input area, simultaneously display the list of contacts for the user and the bookmark list display icon, the recent map-related query list display icon, and the contact list display icon, wherein in response to detecting a finger gesture on a contact in the list of contacts, an area associated with the contact is displayed on a digital map.

5. The device of claim 3, including instructions for:

in response to detecting a finger gesture on the search term input area, displaying a keyboard for entering the one or more search terms; and in response to detecting a finger gesture on a search initiation icon:
sending the one or more entered search terms to a remote computer,
receiving one or more search results, and
displaying at least some of the search results on a digital map.

6. The computer readable storage medium of claim 4, including instructions that cause the device to:

in response to detecting a finger gesture on the search term input area, display a keyboard for entering the one or more search terms; and in response to detecting a finger gesture on a search initiation icon:
send the one or more entered search terms to a remote computer,
receive one or more search results, and
display at least some of the search results on a digital map.

* * * * *